United States Patent
Jain et al.

(10) Patent No.: US 12,412,139 B2
(45) Date of Patent: Sep. 9, 2025

(54) SYSTEM AND METHOD FOR IDENTIFYING RISKY IMPACTED WORK ITEMS

(71) Applicant: OPSHUB INC., Palo Alto, CA (US)

(72) Inventors: Sandeep Jain, Palo Alto, CA (US); Aparna Garg, Gurgaon (IN)

( * ) Notice: Subject to any disclaimer, the term of this patent is extended or adjusted under 35 U.S.C. 154(b) by 653 days.

(21) Appl. No.: 17/733,966

(22) Filed: Apr. 29, 2022

(65) Prior Publication Data

US 2023/0351295 A1 Nov. 2, 2023

(51) Int. Cl.
| | |
|---|---|
| *G06Q 10/0635* | (2023.01) |
| *G06F 8/71* | (2018.01) |
| *G06F 11/3698* | (2025.01) |
| *G06Q 10/067* | (2023.01) |

(52) U.S. Cl.
CPC ........ *G06Q 10/0635* (2013.01); *G06F 8/71* (2013.01); *G06F 11/3698* (2025.01); *G06Q 10/067* (2013.01)

(58) Field of Classification Search
CPC .... G06Q 10/0635; G06Q 10/067; G06F 8/71; G06F 11/3664
See application file for complete search history.

(56) References Cited

U.S. PATENT DOCUMENTS

| | | | | |
|---|---|---|---|---|
| 5,920,312 A | * | 7/1999 | Wagner | G06F 9/451 715/962 |
| 9,354,867 B2 | * | 5/2016 | Jain | G06F 8/70 |
| 10,289,532 B2 | * | 5/2019 | Jain | G06F 11/3676 |
| 10,949,172 B1 | * | 3/2021 | Jain | G06F 11/3676 |
| 11,544,179 B2 | * | 1/2023 | Jain | G06F 8/71 |
| 2014/0007068 A1 | * | 1/2014 | Cullen | G06F 8/73 717/169 |
| 2014/0181796 A1 | * | 6/2014 | Singh | G06F 11/3668 717/132 |
| 2015/0143335 A1 | * | 5/2015 | Jain | G06F 8/70 717/121 |
| 2015/0268951 A1 | * | 9/2015 | Wang | H04L 65/403 717/103 |
| 2016/0004626 A1 | * | 1/2016 | Jain | G06F 11/3684 717/130 |
| 2016/0299835 A1 | * | 10/2016 | Jain | G06F 11/3676 |
| 2018/0089063 A1 | * | 3/2018 | Kral | G06F 11/3688 |
| 2021/0056012 A1 | * | 2/2021 | Nadein | G06F 11/3624 |

(Continued)

*Primary Examiner* — Lewis A Bullock, Jr.
*Assistant Examiner* — Theodore E Hebert
(74) *Attorney, Agent, or Firm* — Joy S Goudie

(57) ABSTRACT

A method and system of identifying risky impacted work items is provided. The method includes identifying work items impacted by a commit between a start tag and an end tag, and information associated with one or more delta lines associated with the impacted work files; computing delta lines for each of the identified work items impacted by the commit, for determining commits that have touched the delta lines and the commits impacted as a result of changes between the start tag and the end tag and fetching work items against which impacted commit was done and impacted work item wise delta lines details; computing delta code coverage information for the work items; determining a list of critical, blocker open issues against all impacted work items and scanning the delta code coverage information for identifying and filtering risky impacted work items based on predetermined criteria and based on the determined list.

13 Claims, 16 Drawing Sheets

(56) References Cited

U.S. PATENT DOCUMENTS

| | | | |
|---|---|---|---|
| 2021/0406001 A1* | 12/2021 | Yang | G06F 11/3664 |
| 2023/0088784 A1* | 3/2023 | Negussie | G06N 20/00 |
| | | | 717/102 |
| 2023/0350788 A1* | 11/2023 | Jain | G06F 11/3676 |

* cited by examiner

FIG.4C

| Impacted Work item ID | DCC% | Open Static code issues | Open Static security code issues |
|---|---|---|---|
| US-233 | 56 | 2 | 0.00 |
| DF-56 | 92.33 | 1 | 0.00 |
| US-5647 | 68.67 | 0 | 0.00 |
| US-122 | 25 | 0 | 0.00 |
| US-777 | 0 | 0 | 0.00 |
| US-9876 | 45.65 | 0 | 0.00 |
| DF-187 | 70.56 | 0 | 0.00 |
| DF-3987 | 34.45 | 4 | 1.00 |
| DF-6987 | 87.5 | 1 | 0.00 |
| DF-376 | 60 | 1 | 1.00 |

FIG.4D

SYSTEM AND METHOD FOR IDENTIFYING RISKY IMPACTED WORK ITEMS

BACKGROUND

Technical Field

The embodiments herein are generally related to risk analysis of software applications. The embodiments herein are particularly related to impact due to changes made in software applications. The embodiments herein are more particularly related to a system and a method for identifying risky impacted work items potentially responsible for causing regression.

Description of the Related Art

Typically, impact analysis engines identify all previous work items that may be broken by changes made for work items being fixed in a current release. When a list of impacted work items grows to as small as even 20 work items, an immediate problem that arises for development or quality team is to scan all 20 or more impacted work items and the scan consumes lot of time. In such scenarios, in order to identify impacted work items, easily consumable for teams without taking lot of their time, there is a need to identify which impacted work items are more likely to cause regression.

Generally, some of the techniques used for identifying impacted work items includes 1) cherry pick some impacted work items, 2) pick impacted work items that were found at customer end, and 3) pick impacted work items from most commonly deployed module. The cherry pick, impacted work items are picked up manually from work item to work item and exposure and knowledge of person doing it largely influences effectiveness of identifying impacted work items which are likely to cause regression. Also picking impacted work items which were found in customer environment is a disaster recipe as that means team is not looking at impacted work items that were found internally or new features. Moreover, picking impacted work items from commonly deployed modules while being better than previous two approaches completely ignores other modules which may be less commonly deployed but is crucial to one of top customers. In addition to being ineffective, another problem with any manual approach is time, as identifying most risky impacted work item is not a one-time process. It is an iterative process during the release and need to be revisited as and when changes are done to code or work items are added or removed. This adds additional lag in release process for team to complete impacted work item scan and share list of riskiest impacted work items with analysis team.

Currently, there are several automated approaches of prioritizing impact by risk, like text-based match. In the existing approaches, key words from a given work item are taken and searched in existing work items. Work items having higher key word match are shown as impacted and can be prioritized by number of successful matches found. While the above approach saves time but lacks efficiency and dependents on people logging the work item to use same glossary and mention related key words in all impacted work items. Moreover, existing approaches used are not sufficient and gives half-baked results.

Hence, there is a long felt need for an automated mechanism using real data to filter and prioritize impacted work items with highest probability of being broken, to helps teams to focus on most likely regressions to occur and increase time and space for innovation. Further there is a need for a system and method to identify riskiest previously resolved work items that are impacted by the code changes done in a release. Still there is need for a system and method to do deep, automated prioritization by risk on basis of code coverage data, changes made in impacted work item and so on. Yet there is a need for a system and method to automatically identify risky impacted artifacts, without any manual intervention.

The above-mentioned shortcomings, disadvantages and problems are addressed herein, and which will be understood by reading and studying the following specification.

OBJECTS OF THE EMBODIMENTS HEREIN

The primary object of the embodiments herein to provide an automated mechanism to filter and prioritize impacted work items with highest probability of being broken, using real data to helps teams to focus on most likely regressions to be occurred and to increase time and space for innovation.

Another object of the embodiments herein is to develop a system and method to identify riskiest previously resolved work items that are impacted by the code changes done in a release.

Yet another object of the embodiments herein is to provide a system and method to do deep, automated prioritization by risk on basis of code coverage data, changes made in impacted work item and so on.

Yet another object of the embodiments herein is to provide a system and method to automatically identify risky impacted artifacts, without any manual intervention.

Yet another object of the embodiments herein is to provide a system and method to gather data from source control tool, ALM tool, and QA tool, and to process the collected data to provide a most risk impacted work items, and tests that needs to be performed for those work items.

Yet another object of the embodiments herein is to provide a system and method to perform a two-step automated process to identify the riskiest work items with low delta coverage or with open security or code issues.

Yet another object of the embodiments herein is to provide a system and method to identify work item ids to enable an end user to fetch any required data from ALM and to tweak the required data to roll up impact to parent work item or any other work item data.

Yet another object of the embodiments herein is to provide a system and method to fetch any other work item information like assignee, area path, team, release, component, product, sprint etc., from ALM tool.

Yet another object of the embodiments herein is to provide a system and method to identify risky impacted component, product, team, release etc., on basis of work item data.

Yet another object of the embodiments herein is to provide a system and method, to fetch linkage data of impacted work item and identify tests that need to be executed to mitigate all risky impacts. If work item and test traceability is maintained in ALM or QA tool.

Yet another object of the embodiments herein is to provide a system and method intended to work with any SCM system, any ALM system, any coverage tool, any static code analysis tool, any static security code analysis tool.

Yet another object of the embodiments herein is to provide a system and method to store all information retrieved from various systems in a relational or non-relational database, thereby minimizing data extraction calls to end system and making solution faster Yet another object of the embodiments herein is to provide a system and method to record work item risk directly in ALM tool.

These and other objects and advantages of the embodiments herein will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This summary is provided to introduce a selection of concepts in a simplified form that are further disclosed in the detailed description. This summary is not intended to determine the scope of the claimed subject matter.

The embodiments herein address the above-recited needs for a system and a method for automated mechanism using real data to filter, prioritize and identify impacted work items with highest probability of being broken, which helps teams focus on most likely regressions to occur and will increase time and space for innovation.

In one aspect, a processor implemented method of identifying risky impacted work items, is provided. The method includes identifying using an impact identification module, one or more work items impacted by a commit between a start tag and an end tag, and information associated with one or more delta lines associated with the impacted work files. The method further includes computing using a delta lines computation module, delta lines for each of the identified work items impacted by the commit, for determining one or more commits that have touched the dela lines and the commits impacted as a result of changes between the start tag and the end tag. The method furthermore includes fetching using the delta lines computation module, work items against which impacted commit was done and impacted work item wise delta lines details. The method furthermore includes scanning using a risk impacted work item identification module, the delta code coverage information associated with impacted work items for identifying and filtering one or more risky impacted work items with at least one of: a low percentage of delta code coverage, an open blocker code or a security issue, based on predetermined criteria and based on the determined list.

In an embodiment, the method includes receiving at least one of: the start tag, the end tag, a code coverage file, a static code analysis data, and a static security code analysis data, associated with the work item, by a user via an interface, prior to identifying one or more work items impacted by the commit.

In an embodiment, the method further includes computing a delta code coverage information for the fetched work items, using a delta code coverage computation module, and wherein the delta code coverage information comprises impacted work item wise delta lines. The method further includes determining, using a static code analysis module, a list of critical, blocker open issues against all impacted work items using the computed delta code coverage and a static security code analysis data.

In an embodiment, the step of computing delta lines includes determining details of commits impacted by commits done between the start tag and the end tag and commit wise reconciled delta lines as a mapping with impacted commits as key and value as list of delta lines touched in the corresponding impacted commit, wherein the mapping comprises a mapping between line number of file content in impacted_commit and line number of file content in end_tag, iterating through the impacted commits by iterating on the delta lines modified for each file in impacted commit and return latest line number of each line for each file, as of file content in end tag, and adding entry and adding an entry in impacted_commit_wise_reconciled_delta_lines with id of impacted commit being iterated on, as key and value as list of reconciled delta lines.

In an embodiment, computing the delta lines includes initializing a variable reconciled_delta_lines as an array of line information, wherein the line information comprises at least one of: a line number, an operation performed on a line, a file path, a file old path, and an operation performed on the file, fetching files touched for the impacted commit from an SCM tool, wherein the files touched comprise information associated with at least one of: a file path, a file old path, and an operation performed on the work file and iterating on the files touched, and returning the variable reconcile_delta_lines.

In an embodiment, iteration includes obtaining a position in variable new_line_number from reconciled_file_lines where value=line number in delta_lines, upon determining that a delta line was added or modified, adding an element in reconcile_delta_lines with line_number set to new_line_number, upon the new_line_number being set, wherein the line operation is set to operation from at least one of: delta_lines, file path to file_path from file_touched, file operation to file operation from file_touched and file old path to old_path from file_touched, and adding an element in reconcile_delta_lines with line_number set to new_line_number, upon the new_line_number not being set then, where line operation set to "removed", file path to file path from file_touched, file operation to file operation from file_touched and file old path to old_path from file_touched.

In an embodiment, for determining commits impacted by a variable and commit wise reconciled delta lines as a map, a get reconciled file content module is used for reading a file content from the SCM tool as of impacted_commit, splitting the file content by new line (\\n) and set it in string array content_as_array, and initializing variable file_lines as an array of integer. The size of array remains same as size of content_as_array, iterating on file_lines and setting value to value of previous index+1, with first index set to 1. The determining reconciling lines further includes getting delta lines for file_path between impacted commit and end_tag. The determining commits further includes iterating on all removed lines, from delta lines by obtaining line_number that got removed from current element of removed lines, deleting the row from array file_lines where value=line_number; iterating on all added lines, from delta lines getting line_number that got added from current element of added lines, adding the row to array file_lines at position line_number with value set to −1; and returning file_lines.

According to an embodiment herein, a delta code coverage is calculated for the impacted work items before performing a static code analysis, to fetch code coverage for reconciled delta lines from the impacted commits.

In an embodiment, determining, a list of critical, blocker open issues against all impacted work items includes calculating a total number of open blocker and critical code issues based on mapping of work item id and list of delta lines touched for that work item id, and static code analysis file, based on workitem_wise_delta_lines for each work item, by parsing, by the static code analysis module, a static code analysis file and storing the parsed information in as file wise_code_analysis file comprising a file wise map of information associated with open issues in a given file, initializing a variable workitem_wise_code_analysis as map with work item id as key and list of open issues as value, and iterating through each work item in workitem_wise_delta_lines. The iteration is performed by initializing workitem_issues to array of issues. The issue holds information comprising at least an issue name, a line number, an issue severity. Further, the iteration includes iterating through delta lines for given work item by fetching open issues from file_wise_code_analysis using file path in delta line; and taking line number from delta lines and if that line number exists in open issues details for this file, then add an issue in issues in workitem_wise_code_analysis against key that matches work item id being iterated currently and returning workitem_wise_code_analysis.

In another aspect, a system for identifying risky impacted work items is provided. The system includes a memory comprising one or more executable modules; and a processor configured to execute the one or more executable modules for identifying risky impacted work items. The one or more executable modules includes an impact identification module configured for identifying one or more work items impacted by a commit between a start tag and an end tag, and information associated with one or more delta lines associated with the impacted work files.

The delta lines computation module is configured to compute delta lines for each of the identified work items impacted by the commit, for determining one or more commits that have touched the dela lines and the commits impacted as a result of changes between the start tag and the end tag, fetching work items against which impacted commit was done and impacted work item wise delta lines details, and computing delta code coverage information for the fetched work items. The delta code coverage information comprises impacted work item wise delta lines. The static code analysis module is configured for determining, using a static code analysis module, a list of critical, blocker open issues against all impacted work items using the computed delta code coverage and a static security code analysis data. The risk impacted work item identification module is configured for scanning the delta code coverage information associated with impacted work items for identifying and filtering one or more risky impacted work items with at least one of: a low percentage of delta code coverage, an open blocker code or a security issue, based on predetermined criteria and based on the determined list.

The system further includes a data module for receiving at least one of: the start tag, the end tag, a code coverage file, a static code analysis data, and a static security code analysis data, associated with the work item, from a user via an interface, prior to identifying one or more work items impacted by the commit.

The delta lines computation module is further configured for: determining commits impacted by a variable and commit wise reconciled delta lines as a mapping with impacted commits as key and value as list of delta lines touched in the corresponding commit, where the mapping comprises a mapping between line number of file content in impacted_commit and line number of file content in end_tag, iterate through the impacted commits by iterating on the delta lines modified for each file in impacted commit and return latest line number of each line for each file, as a file content in end tag; and add an entry in impacted_commit_wise_reconciled_delta_lines with secure hash algorithm (SHA) of impacted commit being iterated on, as key and a value as a list of reconciled delta lines.

The delta lines computation module is further configured for initializing a variable reconciled_delta_lines as an array of line information, where the line information comprises at least one of: a line number, an operation performed on a line, a file path, a file old path, and an operation performed on the file, fetching files touched for the impacted commit from an source control management (SCM) tool, where the files touched comprise information associated with at least one of: a like file path, a file old path, and an operation performed on the work file and iterating on the files touched; and returning the variable reconcile_delta_lines.

In an embodiment, the delta lines computation module is further configured for: obtaining a position in variable new_fine_number from reconciled_file_lines where value=line number in delta_lines, upon determining that a delta line was added or modified, adding an element in reconcile_delta_lines with line_number set to new_line_number, upon the new_line_number being set, wherein the line operation is set to operation from at least one of: delta_lines, file path to file_path from file_touched, file operation to file_operation from file_touched and file old path to old_path from file_touched, and adding an element in reconcile_delta_lines with line number set to new_line_number, upon the new_line_number not being set then, wherein line operation set to "removed", file path to file_path from file_touched, file operation to file_operation from file_touched and file old path to old_path from file_touched.

In an embodiment, the system further includes a reconciled file content module for reading, a file content from the SCM tool as of impacted_commit, splitting the file content by new line (\\n) and set it in string array content_as_array, initializing variable file_lines as an array of integer, wherein a size of array is same as size of content_as_array, iterating on file_lines and setting value to value of previous index+1, with first index set to 1 and iterating on all removed lines, from delta lines on file between impacted commit and end_tag. The iteration is performed by obtaining line_number that got removed from current element of removed lines, deleting the row from array file_lines where value=line_number, iterating on all added lines, from delta lines on file between impacted commit and end_tag, getting line-number that got added from current element of added lines, adding the row to array file_lines at position line number with value set to −1, and returning file_lines.

In an embodiment, the static code analysis module is further configured for: calculating a total number of open blocker and critical code issues based on mapping of work item id and list of delta lines touched for that work item id, and static code analysis file, based on workitem_wise_delta_lines for each work item by: parsing, by the static code analysis module, a static code analysis file and storing the parsed information in as file_wise_code_analysis file comprising a file wise map of information associated with open issues in a given file, initializing a variable workitem_wise_code_analysis as map with work item id as key and list of open issues as value, iterating through each work item in workitem_wise_delta_lines. The iteration is performed by initializing workitem_issues to array of issues. The issue holds information comprising issue name, line number, issue severity; and iterating through delta lines for given work item by fetching open issues from file_wisecode_analysis using file path in delta line, taking line number from delta lines and if that line number exists in open issues details for this file, then add an issue in issues in workitem_wise_code_analysis against key that matches work item id being iterated currently, and returning workitem_wise_code_analysis.

In yet another aspect, one or more non-transitory computer readable storage mediums storing one or more sequences of instructions, which when executed by one or more processors, causes a method for identifying risky impacted work items is provided. The method includes identifying using an impact identification module, one or more work items impacted by a commit between a start tag and an end tag, and information associated with one or more delta lines associated with the impacted work files. The method further includes computing using a delta lines computation module, delta lines for each of the identified work items impacted by the commit, for determining one or more commits that have touched the delta lines and the commits impacted as a result of changes between the start tag and the end tag. The method furthermore includes fetching using the delta lines computation module, work items against which impacted commit was done and impacted work item wise delta lines details. The method furthermore includes computing using the delta lines computation module, delta code coverage information for the fetched work items, wherein the delta code coverage information comprises impacted work item wise delta lines. The method furthermore includes determining, using a static code analysis module, a list of critical, blocker open issues against all impacted work items using the computed delta code coverage and a static security code analysis data. The method furthermore includes scanning using a risk impacted work item identification module, the delta code coverage information associated with impacted work items for identifying and filtering one or more risky impacted work items with at least one of: a low percentage of delta code coverage, an open blocker code or a security issue, based on predetermined criteria and based on the determined list.

In an embodiment, the method includes receiving at least one of: the start tag, the end tag, a code coverage file, a static code analysis data, and a static security code analysis data, associated with the work item, by a user via an interface, prior to identifying one or more work items impacted by the commit.

In an embodiment, computing delta lines includes determining commits impacted by a variable and commit wise reconciled delta lines as a mapping with impacted commits as key and value as list of delta lines touched in the corresponding commit, wherein the mapping comprises a mapping between line number of file content in impacted_commit and line number of file content in end_tag, iterating through the impacted commits by iterating on the delta lines modified for each file in impacted commit and return latest line number of each line for each file, as a file content in end tag, and adding entry and adding an entry in impacted_commit_wise_reconciled_delta_lines with sha of impacted commit being iterated on, as key and value as list of reconciled delta lines.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 4C depicts exemplary list of delta lines for each file changed between the start tag and the end tag, in accordance with an exemplary scenario;

FIG. 4D depicts exemplary list of risky impacted work items, in accordance with an exemplary scenario.

Figure 1A:
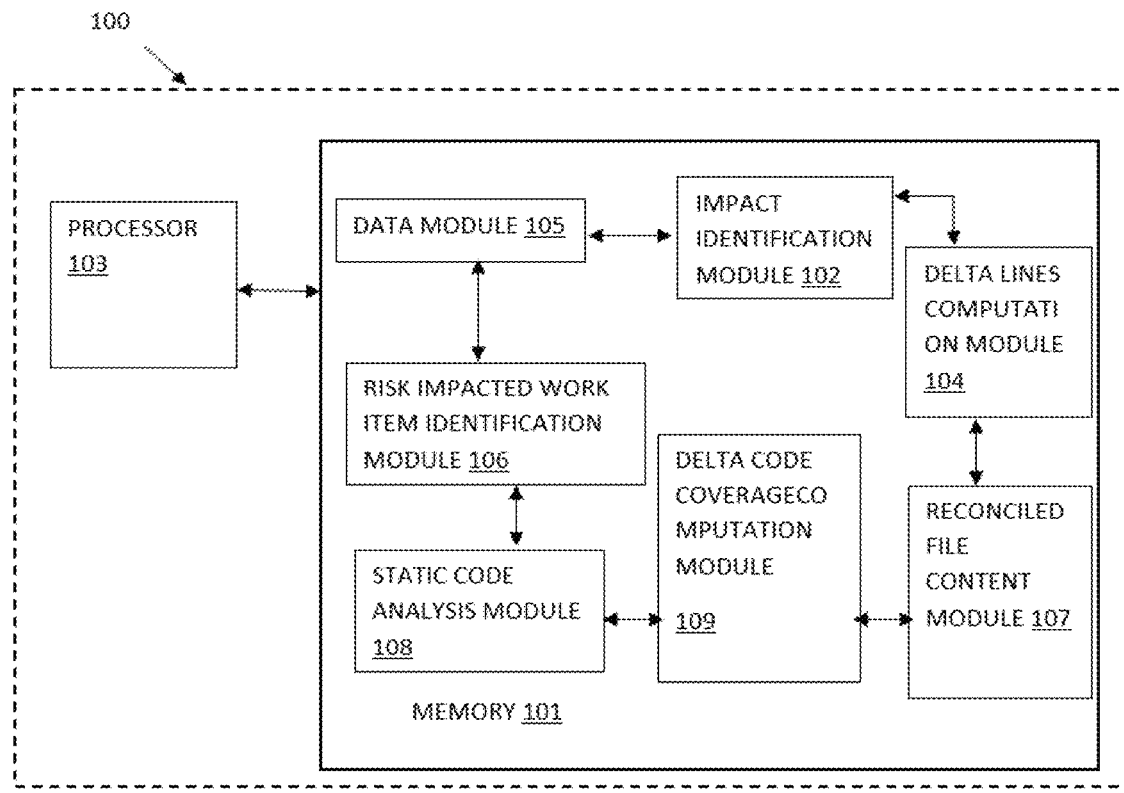
FIG. 1A. illustrates a block diagram of a system for identifying risky impacted work items, in accordance with an embodiment.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The embodiments herein and the various features and advantageous details thereof are explained more fully with reference to the non-limiting embodiments that are illustrated in the accompanying drawings and detailed in the following description. Descriptions of wellknown components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide methods and systems for identifying risky impacted work items. The various embodiment of the present invention provides a system and method of identifying impacted risky items. The method and system of the present technology enables identifying riskiest previously resolved work items that are impacted by the code changes done in a release. There is need to do deep, automated prioritization by risk on basis of code coverage data, changes made in impacted work item and so on. The system of the present technology focuses on automatically identify risky impacted artifacts, without any manual intervention, which enables saving a lot of time. The system of the present technology is configured to be run on any operating system including but not limited to windows or linux can share the machine with other supply chain management (SCM) tools or application life cycle management (ALM) systems without requiring any additional configuration to be done in system. The system of the present technology can be is extended to fetch any other work item information such as, assignee, area path, team, release, component, product, sprint, and the like, from an ALM tool such as for example, Atlassian Jira, Broadcom Rally, Microsoft Azure DevOps, and the like. The system of the present technology can be tuned to identify risky impacted component, product, team, release, and the like, on basis of work item data. The system of the present technology is intended to work with any SCM system (such as Git, Perforce, GitHub, and the like), any ALM system, any coverage tool, any static code analysis tool, any static security code analysis tool or in other words is not limited to a specific tool.

FIG. 1A. illustrates a block diagram of a system for identifying risky impacted work items, in accordance with an embodiment. The system 100 includes a memory 101 and a processor 103. The memory 101 stores one or more executable modules. In an embodiment, the system 100 may be installed in a computing device, such as for example a laptop, a desktop, a tablet computer, a server, and the like. The processor 103 is configured to execute the one or more executable modules for identifying risky impacted work items. The one or more executable modules includes an impact identification module 102, a delta line computation module 104, a data module 105, a risk impacted work item identification module 106, a reconciled file content module 107, a static code analysis module 108, and a delta code coverage computation module 109. In an embodiment, the data module 105 is configured to receive at least one of: a start tag, an end tag, a code coverage file, a static code analysis data, and a static security code analysis data, associated with a work item, from a user via an interface, prior to identifying one or more work items impacted by the commit.

The impact identification module 102 is configured for identifying one or more work items impacted by a commit between the start tag and the end tag, and information associated with one or more delta lines associated with the impacted work files. The delta lines computation module 104 is configured for computing delta lines for each of the identified work items impacted by the commit, for determining one or more commits that have touched the dela lines and the commits impacted as a result of changes between the start tag and the end tag. The delta lines computation module 104 is configured for fetching work items against which impacted commit was done and impacted work item wise delta lines details. The delta lines details includes line number that was touched in commit, file in which line was touched and time of commit.

The delta code coverage computation module 109 is configured for computing delta code coverage information for the fetched work items, where the delta code coverage information comprises impacted work item wise delta lines. The delta code coverage computation module 109 is configured for determining commits impacted by a variable and commit wise reconciled delta lines as a mapping with impacted commits as key and value as list of delta lines touched in the corresponding commit and line number of file content in end_tag, iterating through the impacted commits by iterating on the delta lines modified for each file in impacted commit and return latest line number of each line for each file, as a file content in end tag, and adding an entry in impacted_commit_wise_reconciled_delta_lines with impacted commit being iterated on, as key and a value as a list of reconciled delta lines returned by the reconciled file content module 107. The mapping comprises a mapping between line number of file content in impacted commit.

The delta lines computation module 104 is further configured for initializing a variable reconciled_delta_lines as an array of line information, where the line information comprises at least one of: a line number, an operation performed on a line, a file path, a file old path, and an operation performed on the file. The delta lines computation module 104 is further configured for fetching files touched for the impacted commit from a source control management (SCM) tool. The files touched comprise information associated with at least one of: a like file path, a file old path, and an operation performed on the work file. The delta lines computation module 104 is further configured for iterating on the files touched and returning the variable reconcile_delta_lines. The delta lines computation module 104 is further configured for obtaining a position in variable new_line_number from reconciled_file_lines where value=line number in delta_lines, upon determining that a delta line was added or modified, adding an element in reconcile_delta_lines with line_number set to new_line_number, upon the new_line_number being set, where the line operation is set to operation from at least one of: delta_lines, file path to file_path from file_touched, file operation to file_operation from file_touched and file old path to old_path from file_touched, and adding an element in reconcile_delta_lines with line_number set to new_line_number, upon the new_line_number not being set then or when no value is found in reconciled_files_lines with matching line number. The line operation set to "removed", file path to file_path from file_touched, file operation to file_operation from file_touched and file old path to old_path from file_touched.

The static code analysis module 108 is configured for determining a list of critical, blocker open issues against all impacted work items using the computed delta code coverage and a static security code analysis data. The risk impacted work item identification module 106 is configured for scanning the delta code coverage information associated with impacted work items for identifying and filtering one or more risky impacted work items with at least one of: a low percentage of delta code coverage, an open blocker code or a security issue, based on predetermined criteria and based on the determined list. The reconciled file content module 107 is configured for reading, a file content from the SCM tool as of impacted_commit, splitting the file content by new line (\\n) and set it in string array content_as_array, and initializing variable file_lines as an array of integer. The size of array is same as size of content_as_array. The reconciled file content module 107 is configured for iterating on file_lines and setting value to value of previous index+1, with first index set to 1, 2, 3, and 4. The reconciled file content module 107 is configured for iterating on all removed lines, from delta lines. The removed lines are iterated from delta lines by obtaining line_number that got removed from current element of removed lines, deleting the row from array file_lines, where value=line_number, iterating on all added lines, from delta lines, getting line number that got added from current element of added lines, adding the row to array file_lines at position line number with value set to −1, and returning file lines.

The static code analysis module 108 is configured for calculating a total number of open blocker and critical code issues based on mapping of work item id and list of delta lines touched for that work item id, and static code analysis file, based on workitem_wise_delta_lines for each work item. The total number is calculated by parsing, by the static code analysis module, a static code analysis file and storing the parsed information in as file_wise_code_analysis file comprising a file wise map of information associated with open issues in a given file. In several exemplary embodiments, the static code analysis data is obtained in file formats including, but not limited to CSV, excel, property format and the like The parsers are used to parse JSON or XML structure and convert it into map of files with open code issues information. A variable workitem_wise_code_analysis is initialized as map with work item id as key and list of open issues as value, each work item in workitem_wise_delta_lines is iterated through by initializing workitem_issues to array of issues. The issue holds information like issue name, line number, issue severity. The delta lines are iterated through for given work item by fetching open issues from file_wise_code_analysis using file path in delta line and taking line number from delta lines and if that line number exists in open issues details for this file, then add an issue in issues in workitem_wise_code_analysis against key that matches work item id being iterated currently and returning workitem_wise_code_analysis. The files touched in a commit are retrieved using git log or p4 changes equivalent command.

In an embodiment, each of the components of the system 100 disclosed herein, for example, the impact identification module 102, the delta line computation module 104, the data module 105, the risk impacted work item identification module 106, the reconciled file content module 107, and the static code analysis module 108 are programmable using high-level computer programming languages.

The system 100 disclosed herein comprises multiple processors and non-transitory, computer-readable storage media, for example, memory units, across the framework for storing computer program instructions defined by the components, for example, the impact identification module 102, the delta line computation module 104, the data module 105, the risk impacted work item identification module 106, the reconciled file content module 107, and the static code analysis module 108 of the system 100. The processors are operably and communicatively coupled to the memory units for executing the computer program instructions defined by the components, for example, the impact identification module 102, the delta line computation module 104, the data module 105, the risk impacted work item identification module 106, the reconciled file content module 107, and the static code analysis module 108 of the system 100. The processors refer to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. The system 100 disclosed herein is not limited to employing processors. In an embodiment, the system 100 employs one or more controllers or microcontrollers. In an embodiment, the impact identification module 102, the delta line computation module 104, the data module 105, the risk impacted work item identification module 106, the reconciled file content module 107, and the static code analysis module 108 of the system 100, each defines computer program instructions, which when executed by respective processors, cause the processors to specify and manage predefined policies for containerized workloads. The processors retrieve instructions defined by the impact identification module 102, the delta line computation module 104, the data module 105, the risk impacted work item identification module 106, the reconciled file content module 107, and the static code analysis module 108 of the system 100 from respective memory units for executing respective functions disclosed above.

Figure 1B:
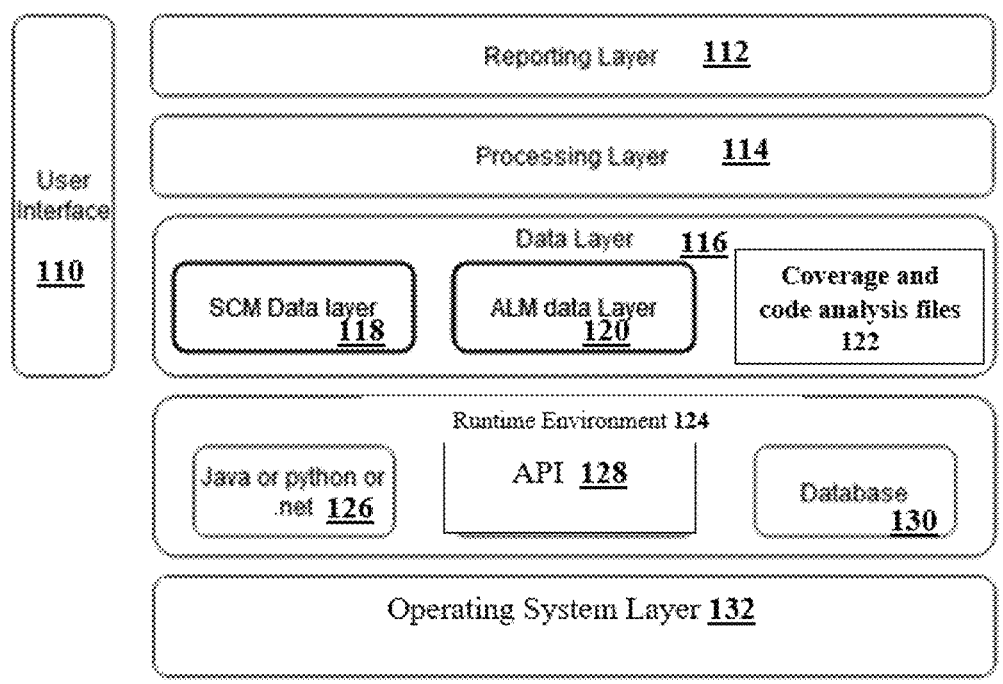
FIG. 1B. illustrates an architecture diagram of the system for identifying risky impacted work items, in accordance with an embodiment.

FIG. 1B. illustrates an architecture diagram of the system 100 for identifying risky impacted work items, in accordance with an embodiment. In several embodiments, a user interface 110 is provided for a user to share a version for which they want to fetch risky impacted work items. The user is allowed to decide what all data they want to see. A reporting layer 112 is responsible for generating report as asked by user and from data shared by processing layer 114. A processing layer 114 acts as orchestrator in a way by sending user input to data layer 116 for processing and coordinating data exchange between a source control management (SCM) data layer 118, an application lifecycle management (ALM) data layer 120 and coverage and code analysis files 122. Once required data is available from data layer 116, it then sends to reporting layer 112 for generating report. In several embodiments, the data layer 116 is responsible for fetching required data from SCM 118, the ALM data layer 120 and coverage files 122. The SCM data layer 118 extracts commit, file and line information from an SCM system. Information is fetched using software development toolkit (SDK) of an end system. The ALM data layer 120 extracts artifact related information from an ALM system. Examples of the artifact information includes, but is not limited to, artifact release, team, area path, sprint, and the like. The information is fetched using SDK provided by the ALM system. The coverage & code analysis files 122 is a readable text file, generally in extensible markup language (XML) or JavaScript object notations (JSONS) format, that has information about code that got covered as part of testing and static analysis done for code. Known tools including, but not limited to JACOCO®, Coverture®, Alover®), and the like, can be used to create coverage files. In several embodiments, tools such as, likes SpotBugs®, PMD®, SonayQube® and the like are used to analyze open issues in code. The run-time environment 124 is written a known programming language including for example, Java or python, .net and the like. The method used to pull data from the SCM Data layer 118 and the ALM data layer 120 includes, but not limited to API, webservices, center for management development (CMD), simple object access protocol (SOAP) and the like. In several embodiments, the database 130 is optional, and is used to store data for efficiency. The operating system layer 132 is run on operating systems including for example, Windows®, Linux®, RHEL, Sun Solaris, and the like. The operating system layer 132 shares the machine with other SCM or ALM based systems without requiring any additional configuration to be done in system 100.

Figure 2A:
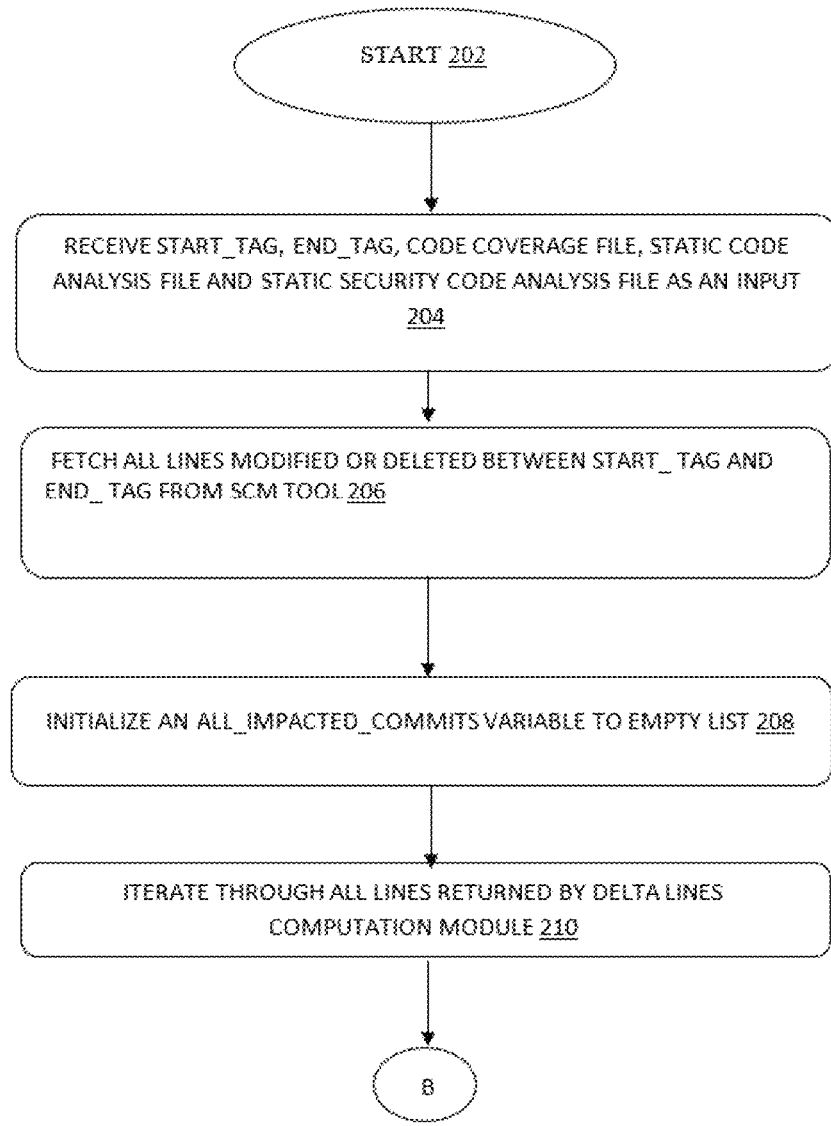
FIG. 2A-2C is a process flow diagram illustrating the process of identifying risky impacted work items, in accordance with an embodiment.
Figure 2B:
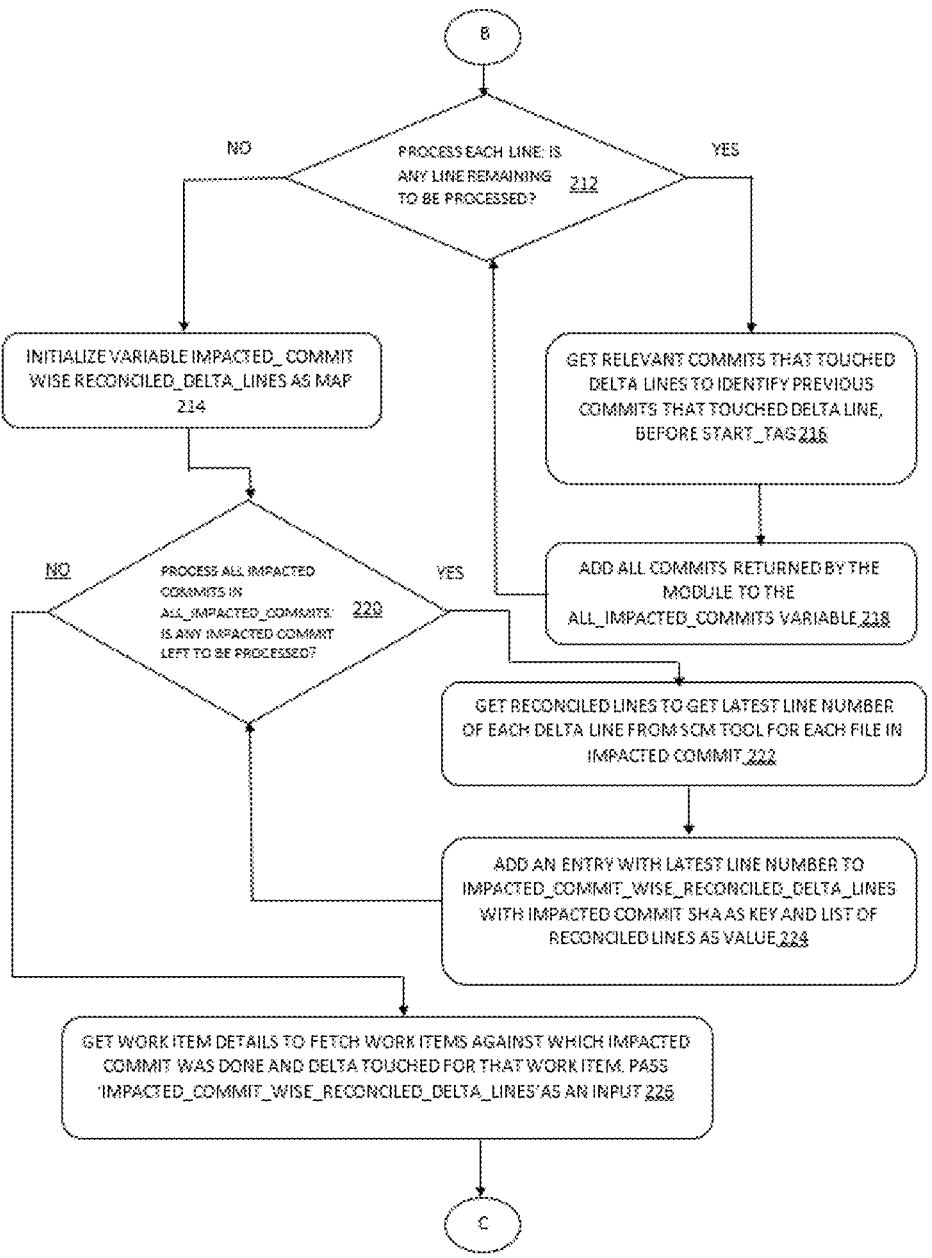
Figure 2C:
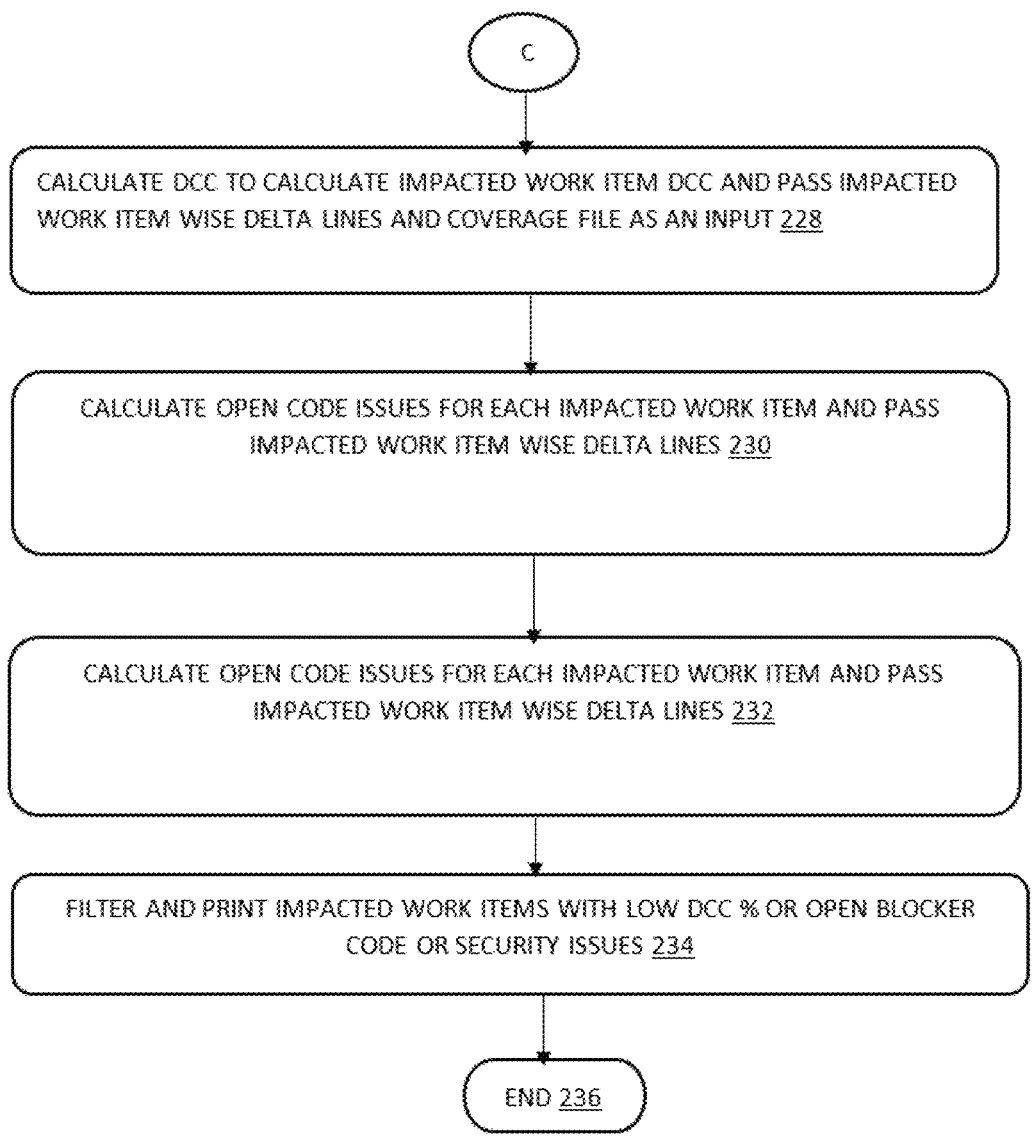

FIGS. 2A-2C is a process flow diagram illustrating the process of identifying risky impacted work items, in accordance with an embodiment. The process begins at step 202. At step 204, a start_tag, an end_tag, a code coverage file, a static code analysis file and a static security code analysis file are received as input. The code coverage file is coverage file generated by code coverage tools like Jacoco®, Cobertura®, and the like, and has line level information for each file in source code, if a given line is tested or not. From a QA tool such as for example, Microfocus ALM, QASymphony qTest, Test Rail, tests related to work items are fetched. The tests details include test id, test name, work item id for which a given test is planned. The static code analysis file is generated by code analyzer tools like FindBugs®, PMD and the like, and has information about coding issues found in each file for a given line. The static security code analysis is generated by static security code analysis tools including, but not limited to, Spot Security Bugs®, Synopsis® and the like, and has information about security vulnerabilities found in each file for a given line. The end_tag is a source control management (SCM) tag name or commit id from source control management. This is the commit id or state of source code repository, as of which code coverage, static code analysis and static security code analysis were done. The start tag is a SCM tag name since when user wants to scan changes for identifying impacted artifacts. At step 206, all lines modified or deleted between start_tag and end_tag are fetched from SCM tool by delta lines computation module 104. The delta lines computation module 104 fetches commits impacted as a result of changes done between start_tag and end_tag. At step 208, all_impacted_commits are initialized to variable to empty list. At step 210, all lines returned by delta lines computation module 104 are iterated.

At step 212, processing of each line is done. If any line to be processed is remaining then at step 216, relevant commits that touched delta lines computation module 104 is called to identify previous commits that touched delta line, before start_tag. At step 218, all commits returned by the delta lines computation module 104 is added to the impacted commit variables. Then the step 212, is repeated. This way, in step 212, if there is no line remaining to be processed then at step 214, variable impacted_commit_wise_reconciled_delta_lines as map is initialized. At step 220, all impacted commits in file all impacted commits are processed. If any impacted commit is left to be processed then at step 222, latest line number of each delta line is obtained from the SCM tool for each file in impacted commit. The delta lines computation module 104 takes an impacted_commit, end_tag and returns delta lines for each file touched in that commit, as of end_tag. At step 224, an entry with latest line number is added to impacted_commit_wise_reconciled_delta_lines with impacted commit SHA as key and list of reconciled lines as value. Then step 220 is repeated. In this way, when all impacted commits are processed in file all_impacted_commits, at step 220, if there is no impacted commit left to be processed then at step 226, work item details module is used to fetch work items against which impacted commit was done and delta lines touched for that work item. Then 'impacted_commit_wise_reconciled_delta_lines' are passed as input. At step 228, delta code coverage (DCC) is calculated to calculate the impacted work item DCC. The impacted work item wise delta lines returned by work item details module and coverage file are passed as input. The work items against which impacted commit was done are fetched and impacted work item wise delta lines details is also fetched. At step 230, the static code analysis module 108 uses the static code analysis file to calculate open code issues for each impacted work item. The impacted work item wise delta lines is passed to delta lines computation module 104. The impacted work item wise delta lines and the static code analysis file is taken as an input and a list of critical, blocker open issues against all impacted work items are computed. At step 232, static code analysis module uses the static code analysis file to calculate open code issues for each impacted work item. Then impacted work item wise delta lines is passed to returned by work items details module. At step 234, the work items with low delta code coverage (DCC) or open blocker code or security issues is filtered and printed.

Figure 2D:
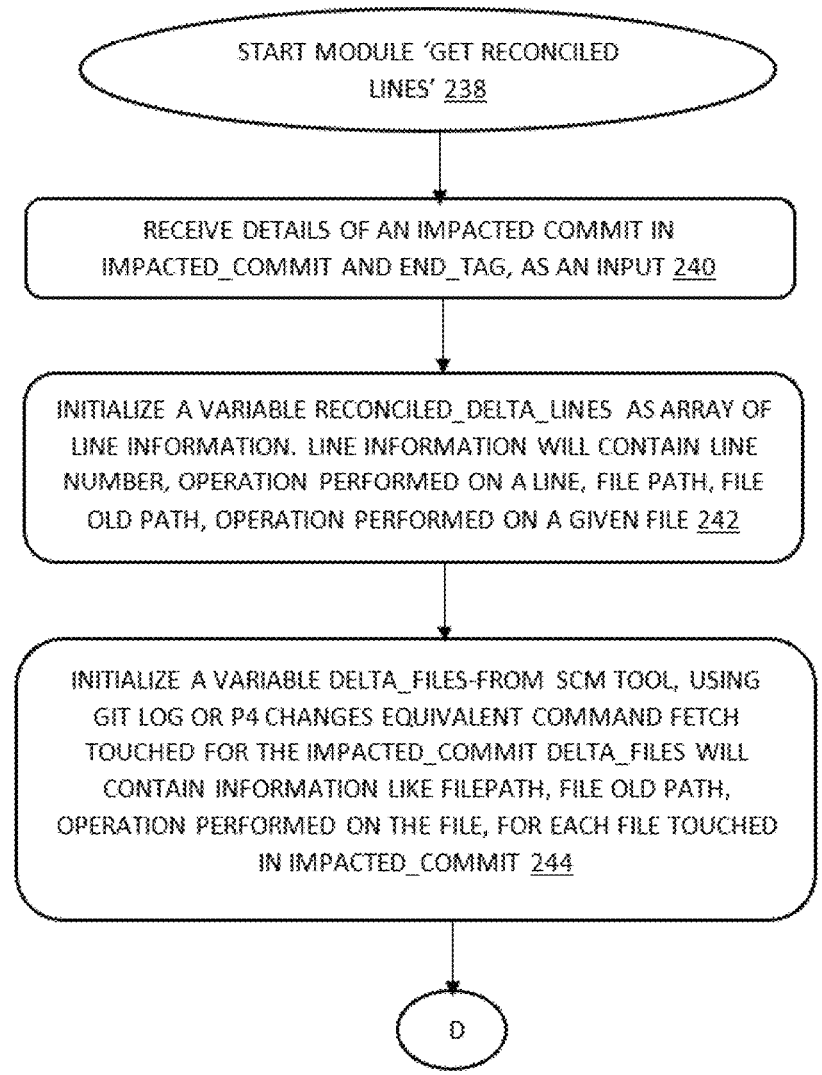
FIG. 2D-2F is a process flow diagram illustrating the process of computing delta lines by a delta lines computation module, in accordance with an embodiment.
Figure 2E:
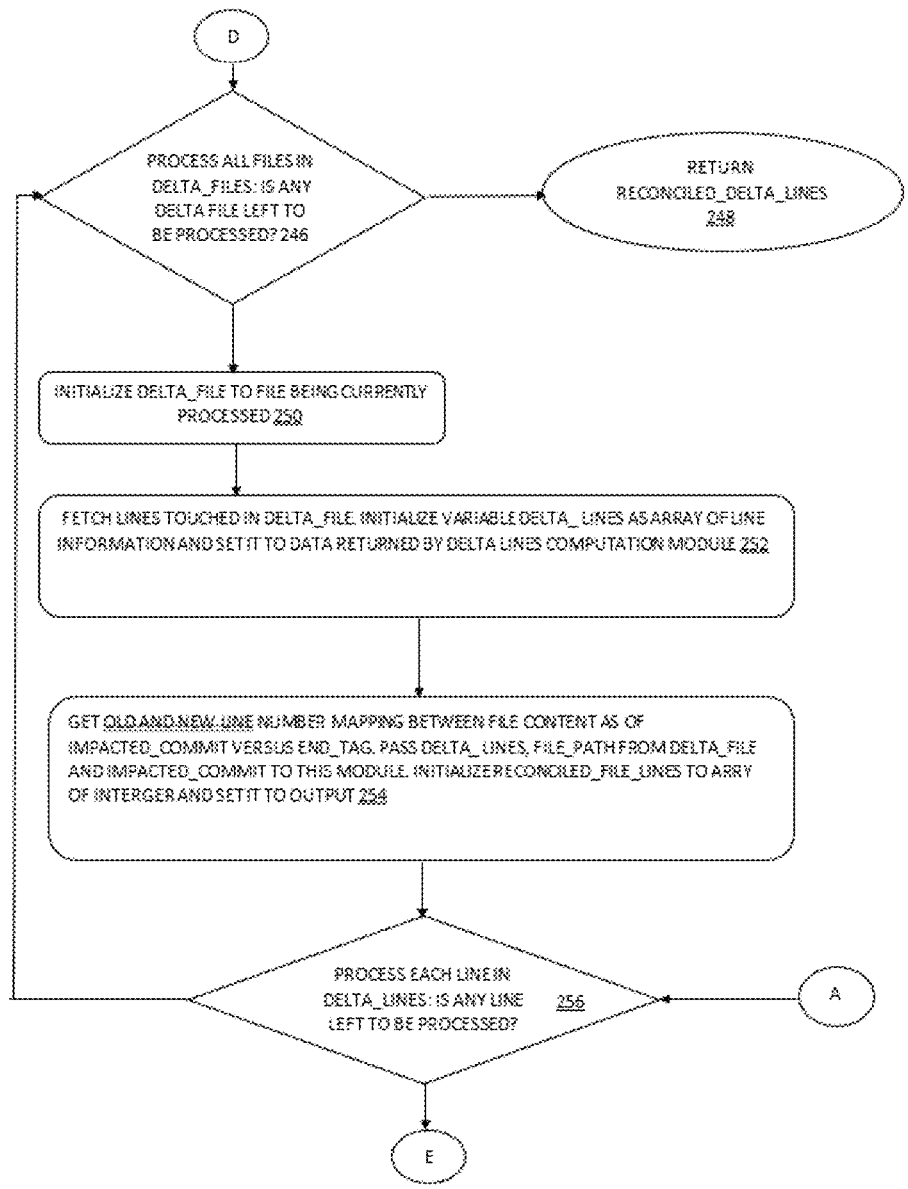
Figure 2F:
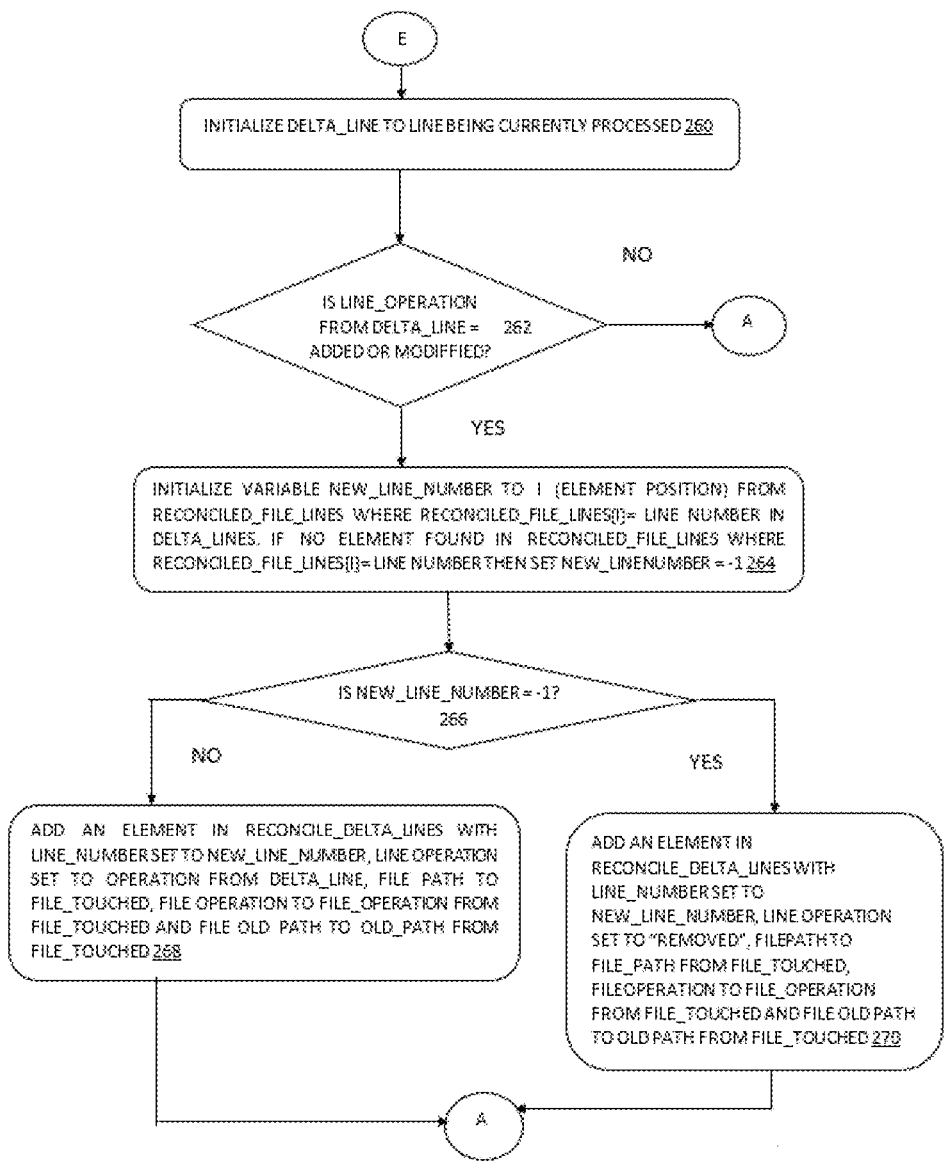

FIGS. 2D-2F is a process flow diagram illustrating the process of computing delta lines by a delta lines computation module 104, in accordance with an embodiment. The delta lines computation module 104 takes an impacted_commit, end_tag and returns delta lines for each file touched in that commit, as of end_tag. For example, if during the commit commit1, line number 5 was modified in file 1 and before end_tag, someone added a new line at position 3 in filet. Now, if we see from end_tag and reconcile line numbers to latest file content then in committ line 6 (then line 5) was modified. At step 240, received details of an impacted commit in impacted_commit and end_tag is provided as input. At step 242, a variable reconciled_delta_lines as array of line information is initialized. The line information contains at least line number, operation performed on a line, file path, file old path, operation performed on the file. At step 244, a variable delta_files is initialized from SCM tool. It uses git log or P4 changes equivalent command to fetch files touched for the impacted_commit passed as input. The files touched includes but is not limited to, information such as a file path, a file old path, and an operation performed on the file. At step 246, all files in delta_files are processed. If no delta file is left to be processed then at step 248, end and return reconciled_delta_lines. If any delta file left to be processed, then at step 250 delta_file is initialized to current touched file being iterated upon or being processed. At step 252, delta lines computation module is used to fetch delta lines from file_touched at step 254, reconciled file content module is used to get line number mapping between file content as of impacted_commit versus end_tag. The delta_lines on file between impacted commit and end_tag, file path and impacted commit is passed. The reconciled_file lines is initialized to array of integer returned by 'get reconciled file content'. At step 256, iterate on delta_lines. At step 264, if line was added or modified, then get position in variable new_line_number from reconciled_file_lines where value=line number in delta_lines. At step 268, if new_line_number is set then add an element in reconcile delta lines with line number set to new_line_number, line operation set to operation from delta_lines, file path to file_path from file_touched, file operation to file_operation from file_touched and file old path to old_path from file_touched. At step 270, if new_line_number is not set (i.e., no value found in reconciled_files_lines with matching line number) then an element is added in reconcile_delta_lines with line_number set to new_line_number, line operation set to "removed", file path to file_path from file_touched, file operation to file_operation from file_touched and file old path to old_path from file_touched. At step 248, return reconcile_delta_lines.

Figure 2G:
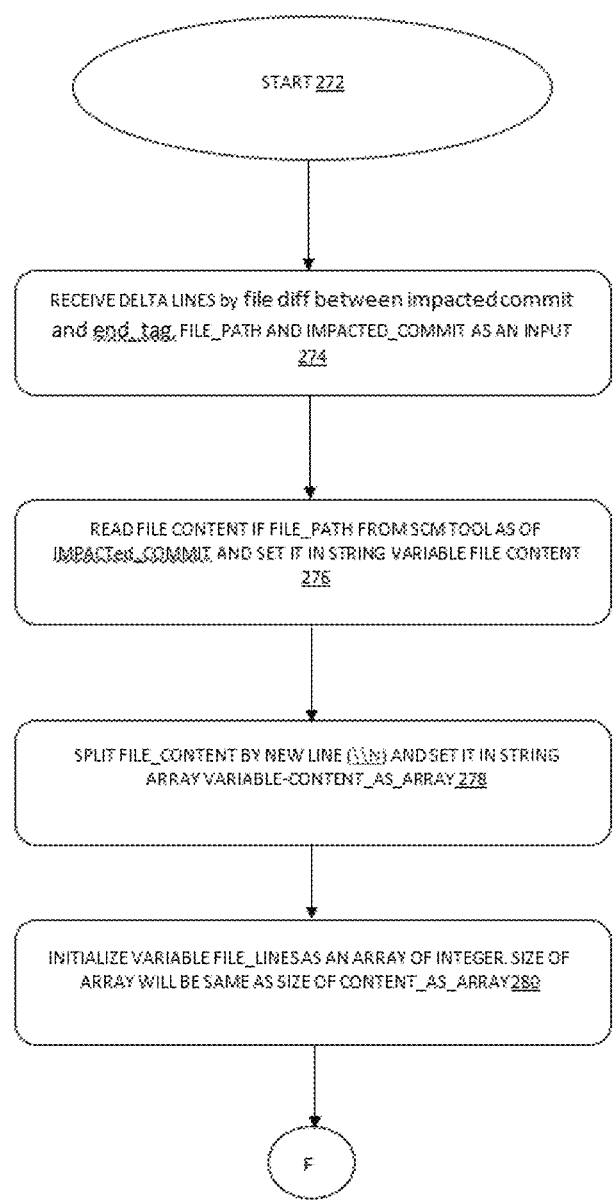
FIGS. 2G-2H depicts a flowchart illustrating steps involved in the process of obtaining the reconciled file content, in accordance with an embodiment.
Figure 2H:
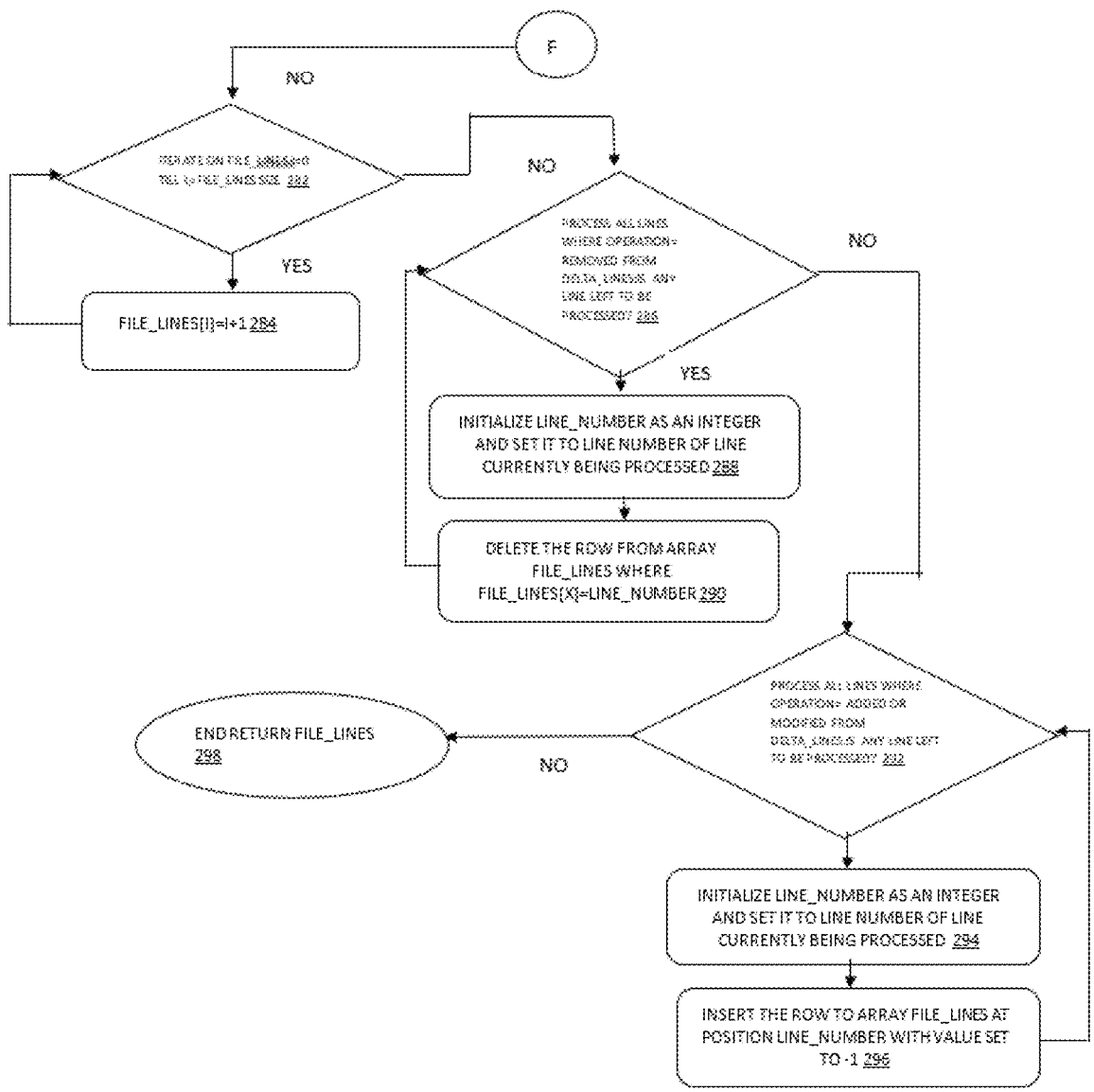

FIGS. 2G-2H depicts a flowchart illustrating steps involved in the process of obtaining the reconciled file content, in accordance with an embodiment. The process starts at step 272. The process includes receiving delta lines, file path and impacted commit as input and returns a mapping between line number of file content in impacted_commit and line number of file content in the end_tag. At step 274, delta lines, file_path and impacted_commit are received as input. At step 276, file content from SCM tool is read as impacted_commit and set in string variable file content. At step 278 file content is split by new line (\\n) and set in string array. At step 280, variable file_lines is initialized as an array of integer. The size of array will be same as size of content_as_array. At step 282, all file_lines are iterated. This is done by setting i=0; if I is less than file_lines. size, then at step 284, file lines sets the value as previous index+1 as file lines [i]=i+1. At step 282, If I is greater than file_lines size then at step 286, all lines where operation should be equal to removed delta lines is processed. If any line is left to be processed then at step 288, get line_number that got removed from a current element of removed lines is initialized and at step 290, the row from array file_lines where value line_number is deleted. If the operation is not equal to removed delta_lines then at step 286, then at step 292, process all lines where operation should be equal to added lines. If any line is left to be processed then at step 294, the line number is initialized as an integer and set to line number of line currently being processed. At step 296, a row is inserted to array file_lines at position line number with value set to −1 and the file_lines are returned. If there is no line left to be processed, then at step 292, then file_lines are returned.

Figure 3A:
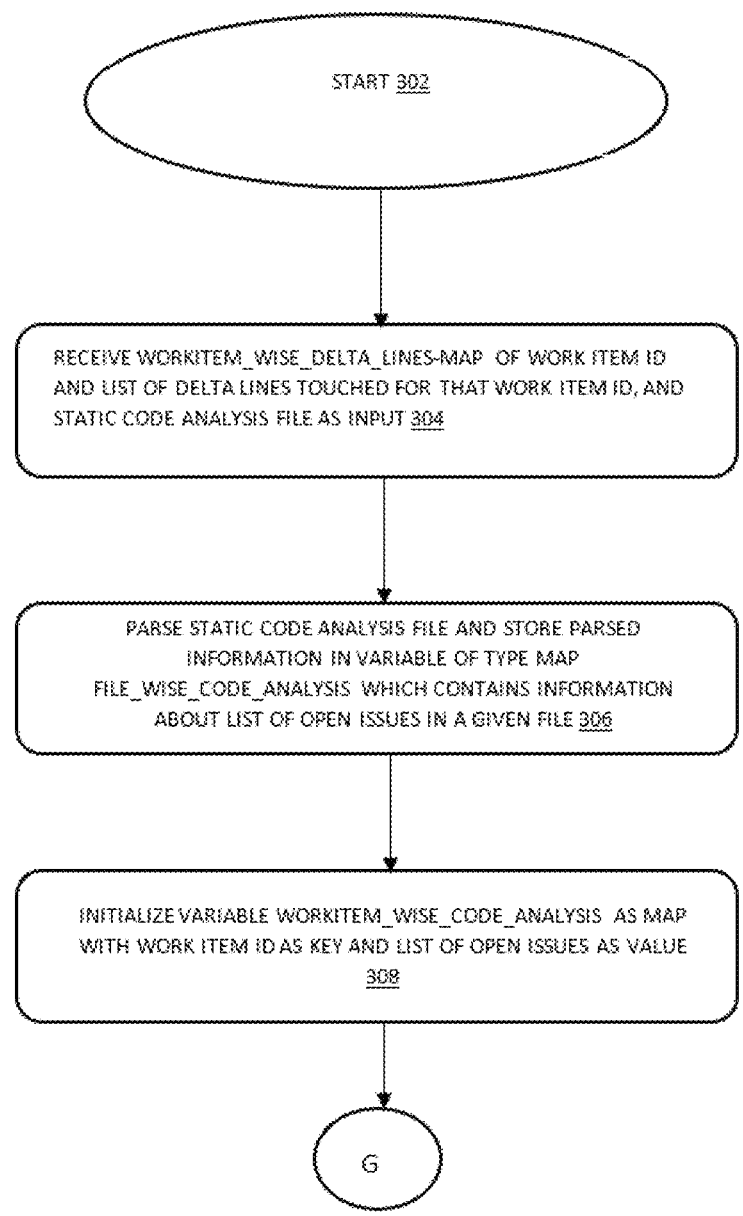
FIGS. 3A-3C illustrate a flow diagram depicting a process of static code analysis, in accordance with an embodiment.
Figure 3B:
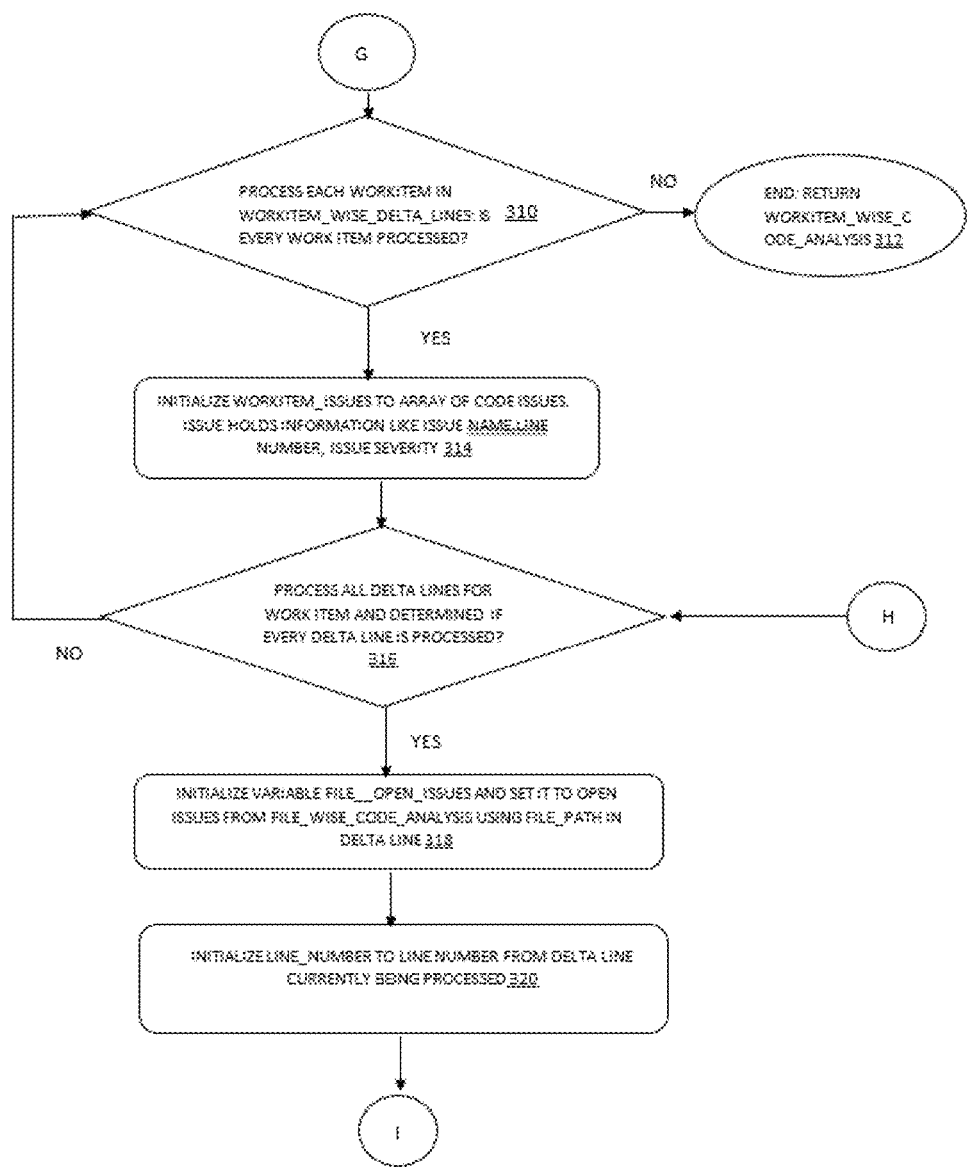
Figure 3C:
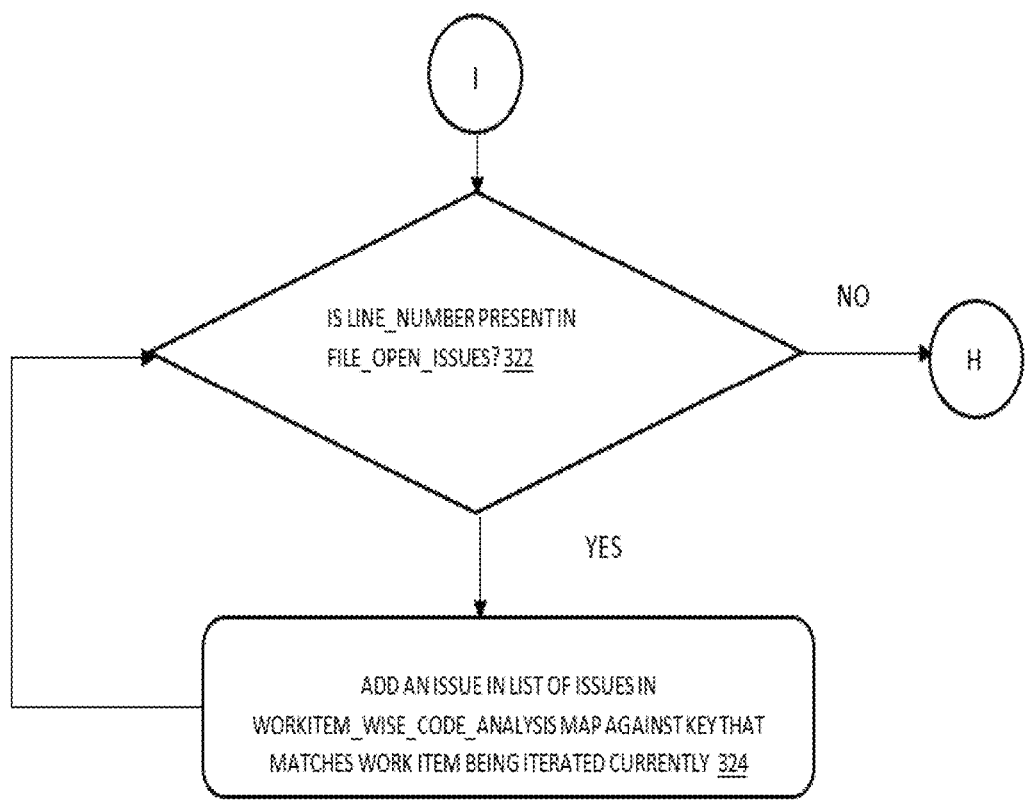

FIGS. 3A-3C illustrate a flow diagram depicting a process of static code analysis, in accordance with an embodiment. The static code analysis module 108 takes workitem_wise_delta_lines, map of work item id and list of delta lines touched for that work item id, and static code analysis file. For each work item, the static code analysis module 108 calculates total number of open blocker and critical code issues. At step 304, workitem_wise_delta_lines and the map of work item id and list of delta lines touched for that work item id, and static code analysis file is received as input. At step 306, the static code analysis file is parsed, and the parsed information stored file wise is mapped and contains information about open issues in a given file. This map is called as file_wise_code_analysis. At step 308, a variable workitem_wise_code_analysis is initialised as map with work item id as key and list of open issues as value. At step 310 each workitem in workitem_wise_delta_lines is processed. At step 310, if every work item is not processed then at step 312, workitem_wise_code_analysis is returned. If every work item is processed then at step 314, workitem_issues are initialized to array of issues. The array of issues holds information such as, issue name, line number, issue severity. At step 316, all delta lines for work item are processed and it is determined if every delta line is processed then at step 318, open issues from file_wise_code_analysis using file path in delta line are fetched. If not repeat to process each workitem in workitem_wise_delta_lines as step 310. At step 322, it is determined if the line number is taken from delta lines and if that line number exists in file open issues. At step 324, an issue is added in the list of issues in workitem_wise_code_analysis map against key that matches work item id being iterated currently.

Figures 4A, 4B:
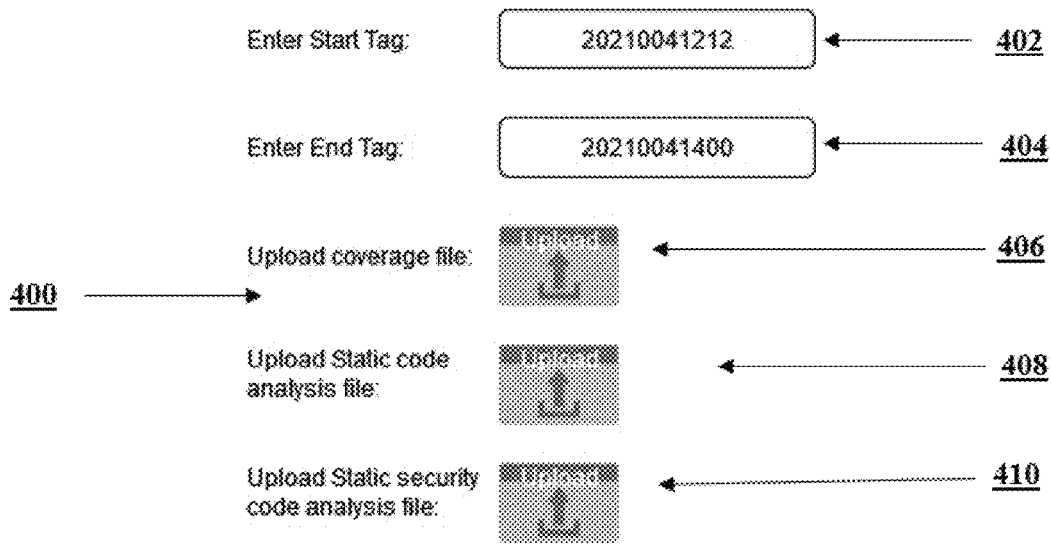
FIG. 4A depicts an exemplary start tag and an exemplary end tag provided by the user, in accordance with an exemplary scenario.
FIG. 4B depicts exemplary files touched between start tag and end tag, in accordance with an exemplary scenario.

FIG. 4A depicts an exemplary start tag and an exemplary end tag provided by the user, in accordance with an exemplary scenario. The start tag 402 and the end tag 404 are provided by the user via an interface. The user is also allowed to provide a coverage file 406, a static code analysis file 408, and a static security code analysis file 410. The code coverage file 406 includes a coverage file generated by code coverage tools including for example, Jacoco®, Cobertura®, and the like and has line level information for each file in source code, if a given line is tested or not. The static code analysis file 408 is generated by code analyzer tools such as FindBugs, PMD and the like, and has information about coding issues found in each file for a given line. The static security code analysis file 410 is generated by static security code analysis tools such as spot security bugs, synopsis, and the like. The static security code analysis file 410 has information about security vulnerabilities found in each file for a given line. The end_tag 404 is a SCM tag name or commit id from source control management. This is the commit id or state of source code repository, as of which code coverage, static code analysis and static security code analysis were done. The start_tag is a SCM tag name since when user wants to scan changes for identifying impacted artifacts.

FIG. 4B depicts exemplary files 412 touched between start tag and end tag, in accordance with an exemplary scenario. The input of this stage is start and end tag given by user and output is list of files touched between start and end tag and is done by iterating through all the impacted commits returned by relevant commits that touched delta lines module. The reconciled file content module 107 iterates on lines modified for each file in impacted commit and returns latest line number of each line for each file, as file content in the end_tag. An entry is added in impacted_commit_wise_reconciled_delta_lines with the impacted commit being iterated on, as key and value as list of reconciled delta lines returned by reconciled lines.

FIG. 4C depicts exemplary list of delta lines 414 for each file changed between the start tag and the end tag, in accordance with an exemplary scenario. The list of all delta lines 414 includes old- and new-line number for each line.

FIG. 4D depicts exemplary list 416 of risky impacted work items, in accordance with an exemplary scenario. The list 416 of risky impacted work items is printed on terminal or a file.

Figure 5:
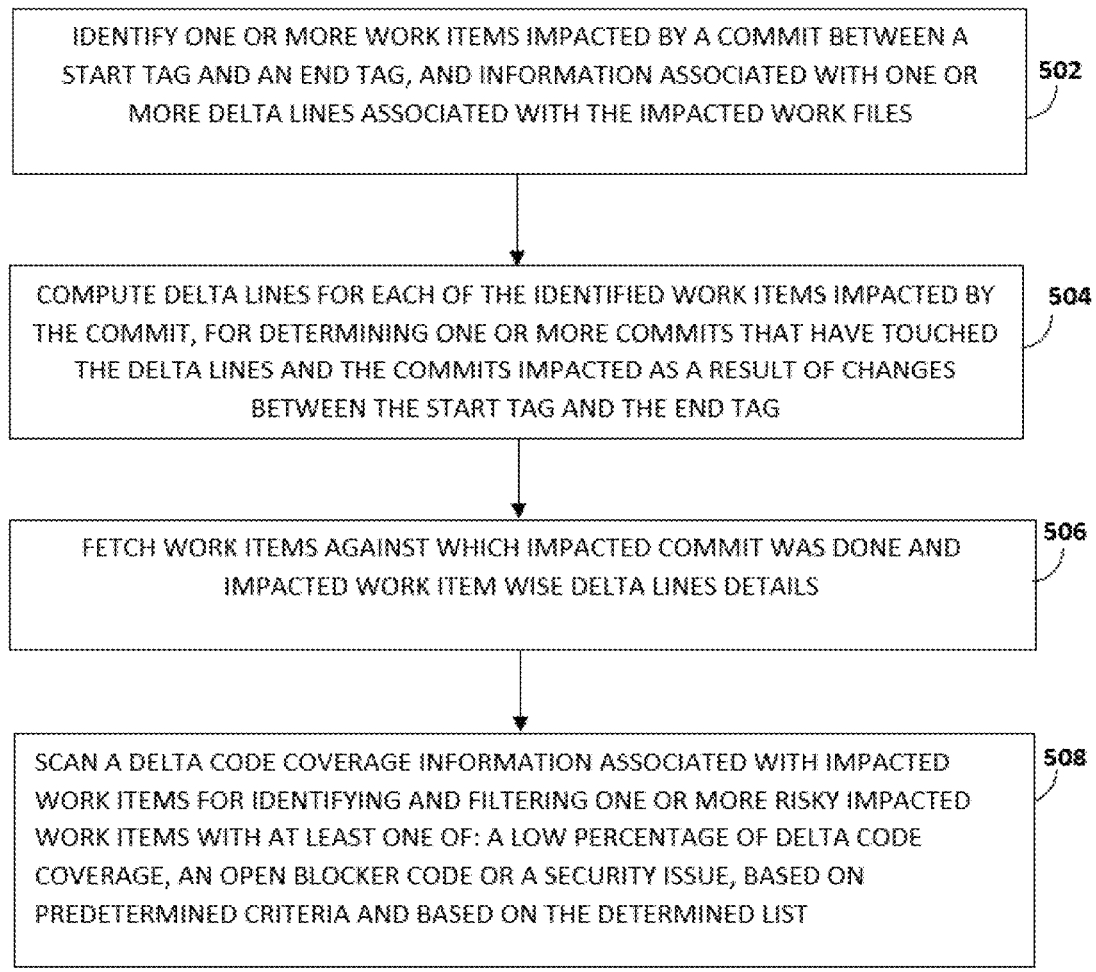
FIG. 5 illustrates a flow diagram of method to identify risky impacted work items, in accordance with an embodiment.

FIG. 5 illustrates a flow diagram of method to identify risky impacted work items, in accordance with an embodiment. At step 502, one or more work items impacted by a commit between a start tag and an end tag and information associated with one or more delta lines associated with the impacted work files, are identified using an impact identification module. At step 504, delta lines for each of the identified work items impacted by the commit are computed using a delta lines computation module, for determining one or more commits that have touched the delta lines and the commits impacted as a result of changes between the start tag and the end tag. At step 506, work items against which impacted commit was done and impacted work item wise delta lines details are fetched using the delta lines computation module. At step 508, a delta code coverage information associated with impacted work items is scanned for identifying and filtering one or more risky impacted work items with at least one of: a low percentage of delta code coverage, an open blocker code or a security issue, based on predetermined criteria and based on the determined list by a risk impacted work item identification module.

Various embodiments disclosed herein provide methods and systems for identifying risky impacted work items. The various embodiment of the present invention provides a system and method of identifying impacted risky items. The method and system of the present technology enables identifying riskiest previously resolved work items that are impacted by the code changes done in a release. There is need to do deep, automated prioritization by risk on basis of code coverage data, changes made in impacted work item and so on. The system of the present technology focuses on automatically identify risky impacted artifacts, without any manual intervention. This will help to save a lot of time. The system of the present technology can share the machine with other SCM or ALM systems without requiring any additional configuration to be done in system. The system of the present technology can be extended to fetch any other work item information like assignee, area path, team, release, component, product, sprint, and the like from ALM tool. The system of the present technology can be tuned to identify risky impacted component, product, team, release, and the like, on basis of work item data. The system of the present technology is intended to work with any SCM system, any ALM system, any coverage tool, any static code analysis tool, any static security code analysis tool or in other words is not limited to a specific tool.

As will be readily apparent to those skilled in the art, the present invention may easily be produced in other specific forms without departing from its essential characteristics. The present embodiments are, therefore, to be considered as merely illustrative and not restrictive, the scope of the invention being indicated by the claims rather than the foregoing description, and all changes which come within therefore intended to be embraced therein.

A "non-transitory computer-readable medium" for purposes of embodiments of the present invention may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real time," "offline," in a "batch mode," etc. Portions of processing can be performed at different times and at different locations, by different (or the same) processing systems.

The embodiments herein can take the form of, an entirely hardware embodiment, an entirely software embodiment or an embodiment including both hardware and software elements. The embodiments that are implemented in software include but are not limited to, firmware, resident software, microcode, and the like. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage. Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims.

What is claimed is:

1. A processor-implemented method of identifying risk-impacted work items, the method comprising:

identifying one or more work items impacted by a commit command executed between a start tag and an end tag, and information associated with one or more delta lines contained in work files touched by the commit command executed between the start tag and the end tag;

identifying the delta lines corresponding to each of the work items impacted by the commit command in each of touched work files, and further identifying one or more commit commands that touched the delta lines and were executed before the start tag, and further determining whether any of the commit commands executed before the start tag have been impacted as a result of changes performed on the work items due to an execution of the commit command between the start tag and the end tag, and wherein identifying the delta lines further includes:

creating a variable termed 'impacted-commit' and storing in the variable termed 'impacted-commit', line numbers of the delta lines corresponding to one or more impacted commit commands;

creating a variable termed 'commit-wise reconciled delta lines' as a map and adding to the map, the impacted commit commands as a key and a list of the delta lines touched by the impacted commit commands as a value, and thereby mapping, for each of the work files touched by the impacted commit commands, the line numbers of work file content touched by each of the impacted commit commands and the line numbers of the work file content originally stored in the end tag;

iterating the delta lines corresponding to the impacted commit commands in each of the work files touched by the impacted commit commands and returning a latest line number corresponding to each of iterated delta lines, to be stored in a variable termed 'file-content' in the end tag;

creating a variable termed 'impacted commit-wise reconciled delta lines' as a map and adding to the map termed 'impacted commit-wise reconciled delta lines', an SHA (Secure Hash Algorithm) corresponding to each of the impacted commit commands as a key and a list of reconciled data lines as a value;

fetching the work items against which the impacted commit commands were executed and fetching work item-wise details of the reconciled delta lines corresponding to the impacted commit commands; and scanning a delta code coverage information associated with the work items against which the impacted commit commands were executed, for identifying and filtering the risk-impacted work items characterized by at least one of: a low percentage of delta code coverage, an open blocker code, or a security issue.

2. The processor-implemented method of claim 1, comprises receiving at least one of: the start tag, the end tag, a code coverage file, and static code analysis data prior to identifying the work items impacted by the commit command executed between the start tag and end tag.

3. The processor-implemented method of claim 1, wherein computing the delta lines further comprises:

initializing a variable termed 'reconciled-delta-lines' as an array of line information, wherein the line information comprises: the line number, a line operation, a work file path, an old work file old path, and an operation performed on the work file;

fetching the work files touched by the impacted commit commands, and wherein the work files touched by the impacted commit commands contain information associated with at least one of: the work file path, the old work file path, and the operation performed on the work files touched by the impacted commit commands;

iterating each of the work files touched by the impacted commit commands; and returning the variable reconciled-delta-lines; and wherein iterating each of the work files touched by the impacted commit commands further includes:

initializing a variable termed 'reconciled-file-lines' and wherein the variable 'reconciled-file-lines' stores a line number-based mapping between the line numbers of the delta lines corresponding to the impacted commit commands and the line numbers originally stored in the variable termed 'file-content' in the end tag;

initializing a variable termed 'delta-lines' indicative of the line numbers of delta lines added or modified as per the impacted commit commands, a corresponding line operation performed on each of the delta lines, and a file path corresponding to each of the work items that contained the delta lines and against which the impacted commit commands were executed;

in an event a delta line has been added or modified, obtaining a position of an added or modified delta line from the variable 'reconciled-file-lines', and wherein the position of the added or modified delta line is denoted as the line number of the added or modified delta line, and stored in a variable termed 'new-line-number';

adding the line number of the added or modified delta line as an entry to the variable 'reconciled-delta-lines' with the line number set to a value stored in the variable 'new-line-number', and setting the line operation to the line operation indicated by the variable 'delta-lines,' and further adding the information associated with the work file touched by the impacted commit commands to the variable 'reconciled-delta-lines';

in an event the position of the added or modified delta line is not found in the variable 'reconciled-file-lines', adding the line number of the added or modified delta line as an entry to the variable 'reconciled-delta-lines', with the line number set to the value stored in the variable 'new-line-number', and setting the line operation to 'removed,' and further adding the information associated with the work file touched by the impacted commit commands to the variable 'reconciled-delta-lines'; and wherein the method further includes computing the delta code coverage information for the work items against which the impacted commit commands were executed, and wherein the delta code coverage information comprises impacted-work item-wise delta code coverage.

4. The processor-implemented method of claim 3, wherein the method further includes determining critical, blocker open issues corresponding to the work items against which the impacted commit commands were executed, and wherein determining the critical, blocker open issues further comprises:

calculating a total number of open blocker and critical code issues based on a mapping of work item IDs corresponding to each of the work items against which the impacted commit commands were executed and a list of delta lines touched for each of the work item IDs, stored in a variable termed 'work item-wise-delta-lines', and a static code analysis file, by:
  parsing the static code analysis file and storing parsed information in a map termed 'file-wise-code-analysis', wherein the map termed 'file-wise-code-analysis' is a file-wise map of information associated with open issues in each of the work files;
  initializing a variable termed work item-wise-code-analysis as a map with the work item ID as a key and a list of open issues as a value;
  iterating through each of the work items against which the impacted commit commands were executed, indicated by the variable 'work item-wise-delta-lines', by:
    initializing a variable termed 'work item-issues' to an array that holds information comprising at least an issue name, the line number, and an issue severity; and
  iterating through the delta lines for each of the work items against which the impacted commit commands were executed, by:
    fetching open issues from the map termed 'file-wise-code-analysis', by using the file path stored in the variable termed 'delta-lines'; and
    obtaining the line number from the variable termed 'delta-lines' and upon obtained line number existing in the open issues, adding a new issue in the variable termed 'work item-wise-code-analysis' against a key that matches the work item ID corresponding to a currently iterated work item and returning the variable termed 'work item-wise-code-analysis'.

5. The processor-implemented method of claim 4, further comprising:
  determining the critical code issues and open blocker issues within the work items against which the impacted commit commands were executed, by using computed delta code coverage and static security code analysis data contained in the static code analysis file, subsequent to fetching the work items against which the impacted commit commands were executed.

6. The processor-implemented method of claim 1, wherein creating the variable 'commit wise reconciled delta lines' as the map further comprises:
  reading the variable termed 'file-content' corresponding to each of the work files touched by the impacted commit commands;
  splitting the each of the iterated delta lines identified by the variable 'file-content' by newly added delta lines and setting the newly added delta lines in a string array termed 'content-as-array';
  initializing a variable termed 'file-lines' as an array of integers, and wherein a size of the array of integers is equivalent to size of the string array termed 'content-as-array';
  iterating the variable file-lines and setting a value stored in the variable 'file-lines' to a value of a previous array index+1, with a first array index set to 1; and
  iterating all removed lines between each of the impacted commit commands and the end tag by:
    obtaining, from a variable termed 'line-number,' the line number corresponding to a currently removed line;
    deleting a row from the array termed 'file-lines' where a value stored in the array termed 'file-lines' is equivalent to a value stored in the variable line-number;
  iterating the newly added delta lines, located between each of the impacted commit commands and the end tag;
    obtaining, from the variable termed 'line-number', the line number corresponding to a currently added delta line;
    adding a new row to the array termed 'file-lines' at a position denoted by the value stored in the variable termed 'line-number', and setting the value stored in the variable termed 'file-lines' to −1; and
  returning the variable termed 'file-lines'.

7. A system for identifying risky risk-impacted work items, the system comprising:
  a memory; and
  a processor communicably coupled to the memory, the processor configured to identify the risk-impacted work items, the processor configured to:
    identify one or more work items impacted by a commit command executed between a start tag and an end tag, and information associated with one or more delta lines contained in work files touched by the commit command executed between the start tag and the end tag;
    identify the delta lines corresponding to each of the work items impacted by the commit command in each of touched work files, and further identify one or more commit commands that were executed before the start tag and touched the dela lines, and further determine whether any of the commit commands executed before the start tag have been impacted as a result of changes performed on the work items due to an execution of the commit command between the start tag and the end tag;
    create a variable termed 'impacted-commit' and store in the variable termed 'impacted-commit', line numbers of the delta lines corresponding to one or more impacted commit commands;
    create a variable termed 'commit-wise reconciled delta lines' as a map and add to the map, the impacted commit commands as a key and a list of the delta lines touched by the impacted commit commands as a value, and thereby map, for each of the work files touched by the impacted commit commands, the line numbers of work file content touched by each of the impacted commit commands and the line numbers of the work file content originally stored in the end tag;
    iterate the delta lines corresponding to the impacted commit commands in each of the work files touched by the impacted commit commands and return a latest line number corresponding to each of iterated delta lines, to be stored in a variable termed 'file-content' in the end tag;
    create a variable termed 'impacted commit-wise reconciled delta lines' as a map and add to the map termed 'impacted commit-wise reconciled delta lines', an SHA (Secure Hash Algorithm) corresponding to each of the impacted commit commands as a key and a list of reconciled data lines as a value;
    fetch the work items against which the impacted commit commands were executed and fetch work item-wise details of the reconciled delta lines corresponding to the impacted commit commands; and scan delta code coverage information associated with the work items against which the impacted commit commands were performed, for identifying and filtering the risk-impacted work items characterized by at least one of: a low percentage of delta code coverage, an open blocker code, or a security issue.

8. The system of claim 7, wherein the processor is further configured to receive at least one of: the start tag, the end tag, a code coverage file, and static code analysis data associated with the work items, prior to identifying the work items impacted by the commit command executed between the start tag and end tag.

9. The system of claim 7, wherein the processor is further configured to:
　initialize a variable termed 'reconciled-delta-lines' as an array of line information, wherein the line information comprises: a line number, a line operation, a work file path, an old work file path, and an operation performed on the work file;
　fetch the work files touched by the impacted commit commands, and wherein the work files touched by the impacted commit commands contain information associated with at least one of: the work file path, the old work file path, and the operation performed on the work files touched by the impacted commit commands;
　iterate each of the work files touched by the impacted commit commands; and
　return the variable reconciled-delta-lines;
wherein the processor is further configured to:
　initialize a variable termed 'reconciled-file-lines' and wherein the variable 'reconciled-file-lines' stores a line number-based mapping between the line numbers of the delta lines corresponding to the impacted commit commands and the line numbers stored in the variable termed 'file-content' in the end tag;
　initialize a variable termed 'delta-lines' indicative of the line numbers of delta lines added or modified as per the impacted commit commands, a corresponding line operation performed on each of the delta lines, and a file path corresponding to each of the work items that contained the delta lines and against which the impacted commit commands were executed;
　in an event a delta line has been added or modified, obtain a position of an added or modified delta line from the variable 'reconciled-file-lines', and wherein the position of the added or modified delta line is denoted as the line number of the added or modified delta line, and stored in a variable termed 'new-line-number';
　add the line number of the added or modified delta line as an entry to the variable 'reconciled-delta-lines', with the line number set to a value stored in the variable 'new-line-number', and set the line operation to the line operation indicated by the variable 'delta-lines' and further add the information associated with the work file touched by the impacted commit commands to the variable 'reconciled-delta-lines';
　in an event the position of the added or modified delta line is not found in the variable 'reconciled-file-lines', add the line number of the added or modified delta line as an entry to the variable 'reconciled-delta-lines', with the line number set to the value stored in the variable 'new-line-number', and set the line operation to 'removed' and further add the information associated with the work file touched by the impacted commit commands to the variable 'reconciled-delta-lines'; and
wherein the processor is further configured to compute the delta code coverage information for the work items against which the impacted commit commands were executed, and wherein the delta code coverage information comprises impacted-work item-wise delta code coverage.

10. The system of claim 9, wherein the processor is further configured to:
　calculate a total number of open blocker issues and critical code issues based on a mapping of work item IDs corresponding to each of the work items against which the impacted commit commands were executed and a list of delta lines touched for that each of the work item IDs, stored in a variable termed 'work item-wise-delta-lines', and a static code analysis file, by:
　　parsing a static code analysis file and storing parsed information in a map termed 'file-wise-code-analysis', wherein the map termed 'file-wise-code-analysis' is a file-wise map of information associated with open issues in each of the work files;
　　initializing a variable termed 'work item-wise-code-analysis' as a map with the work item ID as a key and a list of open issues as a value;
　　iterating through each of the work items against which the impacted commit commands were executed, indicated by the variable 'work item-wise-delta-lines', by:
　　　initializing a variable termed 'work item-issues' to an array, that holds information comprising at least an issue name, the line number, and an issue severity; and
　　iterating through the delta lines for each of the work items against which the impacted commit commands were executed, by:
　　　fetching open issues from the map termed 'file-wise-code-analysis', by using the file path stored in the variable termed 'delta-lines'; and
　　　obtaining the line number from the variable termed 'delta-lines' and upon obtained line number existing in the open issues, adding a new issue in the variable termed 'work item-wise-code-analysis' against a key that matches the work item ID corresponding to a currently iterated work item and returning the variable termed 'work item-wise-code-analysis'; and
　determine the critical code issues and open blocker issues corresponding to the work items against which the impacted commit commands were executed, by using computed delta code coverage and static security code analysis data contained in the static code analysis file.

11. The system of claim 7, wherein the processor is further configured to:
　read the variable termed 'file-content' corresponding to each of the work files touched by the impacted commit commands;
　split the each of the iterated delta lines identified by the variable 'file-content' by newly added delta lines and set the newly added delta lines in a string array termed 'content-as-array';
　initialize a variable termed 'file-lines' as an array of integers, and wherein a size of the array of integers is equivalent to size of the string array termed 'content-as-array';
　iterate the variable file-lines and set a value stored in the variable 'file-lines' to a value of a previous array index+1, with a first array index set to 1; and iterate all removed lines between each of the impacted commit commands and the end tag by:
  obtaining, from a variable termed 'line-number,' the line number corresponding to a currently removed line;
  deleting a row from the array termed 'file-lines' where a value stored in the array termed 'file-lines' is equivalent to a value stored in the variable line-number;
  iterating the newly added delta lines, located between each of the impacted commit commands and the end tag;
  obtaining, from the variable termed 'line-number', the line number corresponding to a currently added delta line;
  adding a new row to the array termed 'file-lines' at a position denoted by the value stored in the variable termed 'line-number', and setting the value stored in the variable termed 'file-lines' to −1; and
  returning the variable termed 'file-lines'.

12. A non-transitory computer readable storage medium storing computer-executable instructions thereon, said computer-executable instructions which when executed by a processor, causes said processor to:

identify one or more work items impacted by a commit command executed between a start tag and an end tag, and information associated with one or more delta lines contained in work files touched by the commit command executed between the start tag and the end tag;

identify the delta lines for corresponding to each of the work items impacted by the commit command in each of touched work files, and further identify one or more commit commands that were executed before the start tag and touched the delta lines, and further determine whether any of the commit commands executed before the start tag have been impacted as a result of changes performed on the work items due to an execution of the commit command between the start tag and the end tag;

create a variable termed 'impacted-commit' and store in the variable termed 'impacted-commit', line numbers of the delta lines corresponding to one or more impacted commit commands;

create a variable termed 'commit-wise reconciled delta lines' as a map and add to the map, the impacted commit commands as a key and a list of the delta lines touched by the impacted commit commands as a value, and thereby map, for each of the work files touched by the impacted commit commands, the line numbers of work file content touched by each of the impacted commit commands and the line numbers of the work file content originally stored in the end tag;

iterate the delta lines corresponding to the impacted commit commands in each of the work files touched by the impacted commit commands and return a latest line number corresponding to each of iterated delta lines, to be stored in a variable termed 'file-content' in the end tag;

create a variable termed 'impacted commit-wise reconciled delta lines' as a map and adding to the map termed 'impacted commit-wise reconciled delta lines', an SHA (Secure Hash Algorithm) corresponding to each of the impacted commit commands as a key and a list of reconciled data lines as a value;

fetch the work items against which the impacted commit commands were executed and fetching work item-wise details of the reconciled delta lines corresponding to the impacted commit commands; and scan delta code coverage information associated with the work items against which the impacted commit commands were executed, for identifying and filtering the risk-impacted work items characterized by at least one of: a low percentage of delta code coverage, an open blocker code, or a security issue.

13. The computer-executable instructions of claim 12, wherein the computer-executable instructions, when executed by the processor, further cause said processor to receive at least one of: the start tag, the end tag, a code coverage file, and static code analysis data, associated with the work items, prior to identifying the work items impacted by the commit command executed between the start tag and the end tag.

* * * * *